(12) United States Patent
Kubo et al.

(10) Patent No.: US 7,657,082 B2
(45) Date of Patent: Feb. 2, 2010

(54) METHOD, APPARATUS AND SYSTEM FOR MEASURING A WELDING-GROOVE POSITION

(75) Inventors: Sadao Kubo, Akashi (JP); Tadao Shimada, Kobe (JP); Kazuhiko Onoue, Kobe (JP); Hirotaka Uehara, Ashiya (JP); Hirotaka Kinoshita, Kobe (JP); Yukimitsu Suzuki, Anjo (JP); Ichiro Arita, Anjo (JP)

(73) Assignees: Kawasaki Jukogyo Kabushiki Kaisha, Kobe-shi (JP); Central Motor Wheel Co., Ltd., Anjo-shi (JP)

( * ) Notice: Subject to any disclaimer, the term of this patent is extended or adjusted under 35 U.S.C. 154(b) by 695 days.

(21) Appl. No.: 11/335,173

(22) Filed: Jan. 18, 2006

(65) Prior Publication Data

US 2006/0159331 A1 Jul. 20, 2006

(30) Foreign Application Priority Data

Jan. 18, 2005 (JP) ............................. 2005-009767

(51) Int. Cl.
*G06K 9/00* (2006.01)
*A47J 36/02* (2006.01)
*G01C 3/14* (2006.01)
*B23K 26/00* (2006.01)

(52) U.S. Cl. .................... 382/154; 228/101; 356/12; 219/121.63

(58) Field of Classification Search ................. 382/154; 228/101; 356/12; 219/121.63
See application file for complete search history.

(56) References Cited

U.S. PATENT DOCUMENTS

| 4,567,347 | A | | 1/1986 | Ito et al. |
| 4,683,493 | A | * | 7/1987 | Taft et al. ...................... 348/90 |
| 6,542,249 | B1 | * | 4/2003 | Kofman et al. .............. 356/601 |

FOREIGN PATENT DOCUMENTS

| EP | 1314510 | 5/2003 |
| JP | 64-37605 | 2/1989 |
| JP | 2000-346637 | 12/2000 |
| JP | 3228777 | 9/2001 |

* cited by examiner

*Primary Examiner*—Bhavesh M Mehta
*Assistant Examiner*—Kathleen S Yuan
(74) *Attorney, Agent, or Firm*—Alleman Hall McCoy Russell & Tuttle LLP

(57) ABSTRACT

A method of measuring a welding-groove position for an over-lapped fillet welding of thin members, comprising a projection step of projecting a slit light so that the slit light is projected on both the thin members crossing a welding-groove face, a two-dimensional image acquisition step of capturing the slit-light image projected on each of the thin members as two-dimensional images; a three-dimensional conversion step of converting the two-dimensional images into three-dimensional images using a predetermined three-dimensional conversion parameter, and a calculation step of calculating the welding-groove position based on the three-dimensional data of the projected slit-light images, and relative positions between the projected slit-light images in the three-dimensional data defined by shapes and arrangement of the thin members.

13 Claims, 13 Drawing Sheets

METHOD, APPARATUS AND SYSTEM FOR MEASURING A WELDING-GROOVE POSITION

CROSS-REFERENCE TO RELATED APPLICATION

This application is based on and claims priority to Japanese Patent Application No. 2005-009767, filed Jan. 18, 2005, the entire disclosure of which is incorporated herein by reference.

TECHNICAL FIELD

The present invention relates to a method, apparatus, and system for measuring a welding-groove position of work pieces to be welded, using a sensor that projects a slit light or scans with a spot light, etc.

BACKGROUND OF THE INVENTION

A conventional automated welding system using a robot, etc., is configured so that it measures a welding-groove position of work pieces using a sensor that projects a slit laser or scans with a spot laser, etc., before performing welding, and calculates (or corrects) an instruction value for the welding robot based on the measurement, in order to compensate for individual specificity and the misalignment of the work pieces.

For example, Japanese Patent No. 3228777 discloses an apparatus that includes a light source which projects a slit laser light on work pieces with the line of sight being perpendicular to a welding groove (also referred to as "a weld line"), and an area sensor that receives a reflected light from the work pieces. This apparatus is configured so that it calculates a position of the welding groove of the work pieces using the two-dimensional position data based on the intensity signal of the reflected light. However, in the disclosure of the Japanese Patent No. 3228777, typically, end points of the projected laser slit are deformed due to influences of a gap width of the welding groove, a shape of the welding groove surface, a secondary reflection, etc. For this reason, the measured welding-groove position of the work pieces may be inaccurate if only the two-dimensional position data is used. For example, the deformation may be such that one of the end points of the projected slit laser may stretch into the welding groove gap, and the end point may be offset from the true welding-groove position, especially when the gap width of the welding groove is relatively large.

Moreover, an apparatus disclosed in Japanese Unexamined Patent Application No. 2000-346637, includes a displacement sensor that carries out a two-dimensional shape measurement of the welding groove of overlapped pipes to be welded, and a rotating device that is inserted down into the welding groove located in the pipes and rotates the displacement sensor. The displacement sensor is configured to measure a displacement of a welding groove surface of the pipes by scanning the surface with a spot-laser beam. This kind of apparatus is especially suitable to measure welding groove shapes of pipes. However, this apparatus has disadvantages in the tact time (cycle time) of welding especially when the tact time is thought to be important, even when the subject pipes are with the same shapes. That is, the apparatus requires a removal and attachment of the displacement sensor for every measurement.

BRIEF SUMMARY OF THE INVENTION

In one aspect of the present invention, a method of measuring a welding-groove position for an over-lapped fillet welding of thin members is provided. The method includes a projecting step of projecting a slit light so that the slit light is projected on both the thin members crossing a welding-groove face. The method also includes a two-dimensional image acquisition step of capturing the slit-light images projected on each of the thin members as two-dimensional images. The method also includes a three-dimensional conversion step of converting the two-dimensional images into three-dimensional images using a predetermined three-dimensional conversion parameter. The method also includes a calculation step of calculating the welding-groove position based on the three-dimensional data of the projected slit-light images, and relative positions between the projected slit-light images in the three-dimensional data defined by at least shapes and arrangement of the thin members.

In another aspect of the present invention, an apparatus for measuring a welding-groove position for an over-lapped fillet welding of thin members is provided. The apparatus includes a projection module for projecting a slit light so that the slit light is projected on both the thin members crossing a welding-groove face. The apparatus also includes a two-dimensional image acquisition module for capturing the slit-light image projected on each of the thin members as two-dimensional images. The apparatus also includes a three-dimensional conversion module for converting the two-dimensional images into the three-dimensional images using a predetermined three-dimensional conversion parameter. The apparatus also includes a calculation module for calculating the welding-groove position based on the three-dimensional data of the projected slit-light image, and relative positions between the projected three-dimensional images in the three-dimensional data defined by at least the shape and arrangement of the thin members.

In these aspects of the present invention, the welding-groove position is calculated based on the three-dimensional data and relative positions between the projected three-dimensional images in the three-dimensional data. Therefore, it is possible to measure the welding-groove position with sufficient accuracy, even if an end point of the projected slit-light image is deformed under influences of the welding groove gap width, groove face shape, secondary reflection, etc.

Here, the relative positions between the projected slit-light images in the three-dimensional data can be defined from the shapes, arrangement, etc. of the thin members. Therefore, even if the projected slit-light images acquired are not sufficiently accurate due to the above-mentioned influences, the relative positions will not be influenced by the same. Thus, the aspects of the present invention utilize the relative position along with the three-dimensional data to reduce these influences.

Here, the welding-groove position is defined as a joint position at where one of the thin members and groove face cross, and a welding torch which may be aimed by a welding robot aims, for example.

The predetermined three-dimensional conversion parameter may be defined as a camera parameter that is calculated by measuring a plurality of known reference coordinate points using the two-dimensional image acquisition module, such as including a CCD camera.

More specifically, the relative positions between the projected slit-light images in the three-dimensional data may be defined as follows. The groove face is arranged substantially perpendicular or inclined to each of the projected surfaces of the slit light on the thin members. Under these conditions, the slit-light image projected on the slit-light projection surfaces of the thin members or an extension thereof, and the slit-light image projected on the welding-groove face or an extension thereof are perpendicular or inclined to each other.

In still another aspect of the present invention, the method is directed to the condition in which the slit-light image projected on the slit-light projection surfaces of the thin members or an extension thereof, and the slit-light image projected on the welding-groove face or an extension thereof are substantially perpendicular to each other. Under this condition, the projection step may include a step of projecting the slit light substantially in parallel with the welding-groove face. Further, under this condition, the two-dimensional image acquisition step may include a step of capturing a first slit-light image and a second projected slit-light image as two-dimensional images so that the first slit-light image projected on the slit light projection surface of the one thin member, and the second slit-light image projected on the slit-light projection surface of the other thin member are arranged spaced apart and substantially in parallel with each other in the same captured image. Further, under this condition, the calculation step may include a step of calculating an equation for a first approximated straight line of the first projected slit-light image based on the three-dimensional data of the first projected slit-light image. The calculation step may also include a step of calculating an equation for a second approximated straight line of the second projected slit-light image based on the three-dimensional data of the second projected slit-light image. The calculation step may also include a step of calculating a position of an end point of the second approximated line on the side of the welding groove based on the second approximated line equation. The calculation step may also include a step of calculating an equation for a third straight line that passes through the end point, and is substantially perpendicular to the second approximated line, and is intersectable with the first approximated line. The calculation step may also include a step of calculating an intersecting point of the first approximated line and the third line as the welding-groove position based on the first approximated line equation and the third line equation.

Similarly in further aspect of the present invention, the apparatus is directed to a condition in which the slit-light image projected on the slit-light projection surfaces of the thin members or an extension thereof, and the slit-light image projected on the welding-groove face or an extension thereof are substantially perpendicular to each other. Under this condition, the projection module may be configured so that the slit light is projected substantially in parallel with the welding-groove face. Further, under this condition, the two-dimensional image acquisition module may capture a first slit-light image and a second projected slit-light image as two-dimensional images so that the first slit-light image projected on the slit-light projection surface of the one thin member, and the second slit-light image projected on the slit-light projection surface of the other thin member are spaced apart and substantially in parallel with each other in the same captured image. Further under this condition, the calculation module may include a module for calculating an equation for a first approximated straight line of the first projected slit-light image based on the three-dimensional data of the first projected slit-light image. The calculation module may also include a module for calculating an equation for a second approximated straight line of the second projected slit-light image based on the three-dimensional data of the second projected slit-light image. The calculation module may also include a module for calculating a position of an end point of the second approximated line on the side of the welding groove based on the second approximated line equation. The calculation module may also include a module for calculating an equation for a third straight line that passes through the end point, and is substantially perpendicular to the second approximated line, and is intersectable with the first approximated line. The calculation module may also include a module for calculating an intersecting point of the first approximated line and the third line as the welding-groove position based on the first approximated line equation and the third line equation.

According to this aspect of the invention, the apparatus may be applied when a position of a corner portion between the welding-groove face and the second slit-light projection surface, and an end portion of the second projected slit-light image on the side of the welding-groove face are matched. That is, this apparatus may be applied when a burr, slack, etc., does not exist in the corner portion and the end portion does not get influenced by a secondary reflection.

With this configuration of the apparatus, it is possible to calculate the welding-groove position, without using positional information of the other end portion of the first projected slit-light image on the side of the welding groove, which tends to be influenced under the above-mentioned conditions. Thereby, it is possible to calculate the welding-groove position with sufficient accuracy even if the end portion of the first projected slit-light image on the side of the welding groove is offset from a true position thereof due to the large gap width of the welding groove.

In another aspect of the invention, the method is directed to a condition in which the slit-light image projected on the slit-light projection surfaces of the thin members or an extension thereof, and the slit-light image projected on the welding-groove face or an extension thereof are substantially perpendicular to each other. Under this condition, the projection step may include a step of projecting the slit light inclined to the welding-groove face. Further under this condition, the two-dimensional image acquisition step may include a step of capturing a first slit-light image, a second projected slit-light image, and a third slit-light image as two-dimensional images, so that the first slit-light image projected on the slit-light projection surface of the one thin member and the second slit-light image projected on the slit-light projection surface of the other thin member are arranged spaced apart and substantially in parallel with each other in the same captured image, and the third slit-light image projected on the welding-groove face is arranged between the first projected slit-light image and the second projected slit-light image in the captured image. Further under this condition, the calculation step may include a step of calculating an equation for a first approximated straight line of the first projected slit-light image based on the three-dimensional data of the first projected slit-light image. The calculation step may also include a step of calculating an equation for a second approximated straight line of the second projected slit-light image based on the three-dimensional data of the second projected slit-light image. The calculation step may also include a step of calculating a position of a predetermined point on the third projected slit-light image based on the three-dimensional data of the third projected slit-light image. The calculation step may also include a step of calculating an equation for a fourth straight line that is substantially perpendicular to the second approximated straight line, and passes through the predetermined point. The calculation step may also include a step of calculating an intersecting point of the first approximated straight line and the fourth straight line as the welding-groove position based on the first approximated line equation and the fourth line equation.

In another aspect of the present invention, the apparatus is directed to a condition in which the slit-light image projected on the slit-light projection surfaces of the thin members or an extension thereof, and the slit-light image projected on the welding-groove face or an extension thereof are substantially perpendicular to each other. Under this condition, the projection module may project the slit light inclined to the welding-groove face. Further under this condition, the two-dimensional image acquisition module may be configured so that it captures a first projected slit-light image, a second projected slit-light image, and a third projected slit-light image as two-dimensional images, so that the first slit-light image projected on the slit-light projection surface of the one thin member and the second slit-light image projected on the slit-light projection surface of the other thin member are spaced apart and substantially in parallel with each other in the same captured image, and the third slit-light image projected on the welding-groove face is arranged between the first projected slit-light image and the second projected slit-light image in the same captured image. Further under this condition, the calculation module may include a module for calculating an equation for a first approximated straight line of the first projected slit-light image based on the three-dimensional data of the first projected slit-light image. The calculation module may also include a module for calculating an equation for a second approximated straight line of the second projected slit-light image based on the three-dimensional data of the second projected slit-light image. The calculation module may also include a module for calculating a position of a predetermined point on the third projected slit-light image based on the three-dimensional data of the third projected slit-light image. The calculation module may also include a module for calculating an equation for a fourth straight line that is substantially perpendicular to the second approximated straight line, and passes through the predetermined point. The calculation module may also include a module for calculating an intersecting point of the first approximated straight line and the fourth straight line as the welding-groove position based on the first approximated line equation and the fourth line equation.

In this aspect of the invention, the apparatus may be applied when a position of a corner portion between the welding-groove face and the second slit-light projection surface, and an end portion of the second projected slit-light image on the side of the welding-groove face are not matched, due to the influences of burr, slack of the corner portion, a secondary reflection, etc.

With this configuration of the apparatus, it is possible to calculate the welding-groove position, without using positional information of the end portion of the second projected slit-light image on the side of the welding-groove face, and the positional information of the end portion of the one thin member on the side of the welding groove. As a result, it is possible to calculate the welding-groove position with sufficient accuracy, even when the end portion of the first projected slit-light image on the side of the welding groove is offset from a true position thereof due to the large gap width of the welding groove, and even when the corner portion of the other thin member and the end portion of the second projected slit-light image on the side of the welding-groove face are not matched due to burr, slack of the corner portion of the other thin member, a secondary reflection, etc.

In another aspect of the invention, the method is directed to a condition in which the slit-light image projected on the slit-light projection surface of the other thin member or an extension thereof, and the slit-light image projected on the welding-groove face or an extension thereof are inclined to each other. Under this condition, the two-dimensional image acquisition step may include a step of capturing a first slit-light image, a second projected slit-light image, and a third slit-light image as two-dimensional images, so that the first slit-light image projected on the slit-light projection surface of the one thin member and the second slit-light image projected on the slit-light projection surface of the other thin member are arranged spaced apart and substantially in parallel with each other in the same captured image, and the third slit-light image projected on the welding-groove face is arranged between the first projected slit-light image and the second projected slit-light image in the captured image. Further under this condition, the calculation step may include a step of calculating an equation for a first approximated straight line of the first projected slit-light image based on the three-dimensional data of the first projected slit-light image. The calculation step may also include a step of calculating an equation for a second approximated straight line of the second projected slit-light image based on the three-dimensional data of the second projected slit-light image. The calculation step may also include a step of calculating a position of a first end point of a first approximated straight line on the side of the welding groove based on the first approximated line equation, while calculating a position of a second end point of a second approximated straight line on the side of the welding groove based on the second approximated line equation. The calculation step may also include a step of calculating an equation for a fifth straight line of the third projected slit-light image between the first end point position and the second end point position based on the three-dimensional data of the third projected slit-light image. The calculation step may also include a step of calculating an intersecting point of the first approximated straight line and the fifth straight line as the welding-groove position based on the first approximated line equation and the fifth line equation.

In another aspect of the invention, the apparatus is directed to a condition in which the slit-light image projected on the slit-light projection surface of the other thin member or an extension thereof, and the slit-light image projected on the welding-groove face or an extension thereof are inclined to each other. Under this condition, the two-dimensional image acquisition module captures a first slit-light image, a second projected slit-light image, and a third slit-light image as two-dimensional images, so that the first slit-light image projected on the slit-light projection surface of the one thin member and the second slit-light image projected on the slit-light projection surface of the other thin member are arranged spaced apart and substantially in parallel with each other in the same captured image, and the third slit-light image projected on the welding-groove face is arranged between the first projected slit-light image and the second projected slit-light image in the captured image. Further, under this condition, the calculation module may include a module for calculating an equation for a first approximated straight line of the first projected slit-light image based on the three-dimensional data of the first projected slit-light image. The calculation module may also include a module for calculating an equation for a second approximated straight line of the second projected slit-light image based on the three-dimensional data of the second projected slit-light image. The calculation module may also include a module for calculating a position of a first end point of the first approximated straight line on the side of the welding groove based on the first approximated line equation. The calculation module may also include a module for calculating a position of a second end point of the second approximated straight line on the side of the welding groove based on the second approximated line equation. The calculation module may also include a module for calculating an equation for a fifth straight line of the third projected slit-light image between the first end point position and the second end point position based on the three-dimensional data of the third projected slit-light image. The calculation module may also include a module for calculating an intersecting point of the first approximated straight line and the fifth straight line as the welding-groove position based on the first approximated line equation and the fifth line equation.

In this aspect of the invention, the apparatus may be applied when the welding-groove face inclines to the slit-light projection surface of the other thin member.

In this condition, since the above-mentioned relationship that the slit-light projection surface of the other thin member and the welding-groove face cross perpendicularly cannot be applied, the apparatus calculates the intersecting point position as the welding-groove position using the fifth straight line for the third projected slit-light image on a groove face and the first approximated straight line of the first projected slit-light image. Thereby, it is possible to measure the welding-groove position with sufficient accuracy, even when the end portion of the first projected slit-light image on the side of the welding groove is offset from a true position thereof due to the large gap width of the welding groove.

When calculating the fifth straight line, the three-dimensional image data of the third projected slit-light image between the end portion of the first projected slit-light image on the side of the welding groove and the end portion of the second projected slit-light image on the side of the welding groove is used. Thus, it is possible to eliminate the influence of the secondary reflection, etc. by limiting the range of information used for calculating the fifth straight line.

In another aspect of the invention, the apparatus may include a line-of-sight toggle module for changing a line-of-sight of the projection module and/or the two-dimensional image acquisition module with respect to the welding-groove face, based on the relative positions. Thereby, it is possible to change the line-of-sight of the projection module and/or the two-dimensional image acquisition module to a suitable angle for measuring the welding-groove position. The projection module and the two-dimensional image acquisition module may be integrated in one piece such as a laser sensor.

In another aspect of the invention, the apparatus may include a plurality of the apparatuses that can be directed to the different conditions described above. The integrated apparatus may include a reception module for receiving a user input relating to a selection of one of the welding groove measuring apparatuses corresponding to the thin members to be measured, and a toggle module for switching to the one of the welding groove measuring apparatuses based on the user input.

According to this configuration, it is possible to selectively use one of the welding groove measuring apparatuses suitable for the physical relationship between the three-dimensional projection images that is defined by shapes and arrangement of the thin members.

In another aspect of the invention, a welding-groove measurement system is provided to measure a welding-groove position on the welding-groove face located at an end of a cylindrical object in the axial direction. The system may include a welding-groove measuring sensor for projecting a slit light or a scanning spot light on the welding object so that it crosses a welding-groove face of the welding object, capturing a projected light image on the welding object, and calculating a three-dimensional welding groove position based on the projected light image. The system may also include a positioning device for supporting the welding-groove measuring sensor and positioning the welding-groove measuring sensor in a position at which the welding-groove measuring sensor can measure the three-dimensional welding groove position. The system may also include a rotating device for arranging the welding object so that an axial center of the welding object substantially aligns with a rotational axis of the rotating device, and rotates the welding object with respect to the welding-groove measuring sensor. The system may also include a rotational-angle measuring device for measuring a rotational angle of the rotating device on the rotational axis. The system may also include a first reception module communicatively coupled with the welding-groove measuring sensor and the rotational-angle measuring device, and for receiving the three-dimensional welding groove position from the welding-groove measuring sensor and the rotational angle of the rotating device from the rotational-angle measuring device, simultaneously, at a predetermined time interval. The system may also include a first buffer for storing the rotational angle with a first receiving time received by the first reception module while associating the rotational angle with the first receiving time. The system may also include a phase-delay correcting module for calculating a rotational angle of the rotating device stored in the first buffer at a time before a phase-delay time from the first receiving time as a corresponding rotational angle. The phase-delay time is a phase-delay time of the three-dimensional welding groove position with respect to the rotational angle that is generated according to the rotational speed of the rotating device and an image-processing speed of the welding-groove measuring sensor. The system may also include a conversion module for converting the three-dimensional welding groove position from a coordinate system of the positioning device into a coordinate system that uses the axial center of the welding object as a base axis.

According to this configuration using the phase-delay correcting module, it is possible to cancel the phase delay of the three-dimensional welding groove position with respect to the rotational angle resulting from the rotational speed of the rotating device, the image-processing speed of the welding-groove measuring sensor, etc. As a result, it is possible to measure the welding-groove position of the welding object with sufficient accuracy.

Typically, the welding object is conveyed in a welding area while being placed on the rotating device after the welding-groove position is measured by the welding-groove measurement system. Then, the welding object is welded by a welding robot etc. along with the welding groove. A controller for the welding robot typically receives the three-dimensional welding groove position from the welding-groove measurement system. The controller may further convert the three-dimensional welding groove position into a coordinate system of the welding robot using a relative position between a reference point of the coordinate system of the welding object and the reference point of a coordinate system of the welding robot. This conversion may be performed because a spaced distance between the welding object and the welding robot is notably short compared with a spaced distance between the positioning device of the welding-groove measurement system and the welding robot. Therefore, this conversion induces more accurate results than the conversion of the three-dimensional welding groove position from the coordinate system of the positioning device of the welding-groove measurement system into the coordinate system of the welding robot.

In this configuration, on the other hand, the welding-groove position may be measured while the welding object is rotated with respect to the welding-groove measuring sensor using the rotating device. This eliminates an adjustment of the position of the welding-groove measuring sensor once the welding-groove measuring sensor is positioned. As a result, it is possible to measure the welding-groove position quickly merely by rotating the welding object.

In another aspect of the invention, the system may include a first interpolation module for interpolating an intermediate three-dimensional welding groove position corresponding to an intermediate angle between the corresponding rotational angles based on the corresponding rotational angles and the corresponding three-dimensional welding groove positions.

Typically, the image-processing speed of the welding-groove measuring sensor is equivalent to a frame rate thereof as a maximum, and approximately 30 Hz or 60 Hz. That is, the image-processing speed of the welding-groove measuring sensor typically is restricted by the frame rate. Therefore, when measuring at 60 Hz, the rotational speed is 60 deg/sec or less in order to obtain the data at 1 degree interval. This means that 6 seconds or more are needed to measure 360 degrees. On the other hand, if the rotational speed is increased in order to shorten the tact time, the measurement interval becomes large and the three-dimensional welding groove position at a desired measuring point may not be obtained. To solve this situation, the above-mentioned interpolation is made.

In another aspect of the invention, the system may further include a module for determining whether or not a variation of the three-dimensional welding groove positions between the corresponding rotational angle at a certain time and the corresponding rotational angle at a time before the certain time is greater than a predetermined value, based on the corresponding rotational angles and the corresponding three-dimensional welding groove positions. The system may also include a module for grouping the three-dimensional welding groove positions in which variation is greater than the predetermined value and determined as an abnormal value. The system may also include a first determination module for determining that the three-dimensional welding groove position belonging to a group with the most number of the three-dimensional welding groove positions is normal. The abnormal three-dimensional welding groove position may be interpolated based on the normal three-dimensional welding groove positions and the corresponding rotational angles.

Typically, the welding groove of the welding object is formed smoothly and continuously and, thus, the three-dimensional welding groove positions are continuous values. The abnormality of the three-dimensional welding groove position is determined using such characteristic of the three-dimensional welding groove position.

In another aspect of the invention, the system is directed to a condition in which the welding-groove positions of a plurality of the welding objects are measured one by one. The system may include a second reception module for receiving a user input relating to a change in the type of welding object. The system may also include a first average/dispersion calculation module for calculating an average value and a dispersion value of a plurality of three-dimensional welding groove positions corresponding to one corresponding rotational angle of each welding object, based on the corresponding rotational angles and the corresponding three-dimensional welding groove positions obtained for the plurality of welding objects. The system may also include a first rotational speed change module for instructing the rotating device to change the rotational speed based on the average values and dispersion values that are calculated one by one after the second reception module received the user input.

The two parameters (i.e., the average value and dispersion value) typically represent a variation in the measured values of the system. Typically, the variation is large immediately after changing a type of the welding object from one type to another. The system may be configured so that it changes the rotational speed of the rotating device according to the variation. More specifically, the system may increase the rotational speed when the variation is small, and the system may decrease the rotational speed when the variation in the measured value is large. In other words, it will become possible to change the rotational speed of a rotating device, maintaining the measurement accuracy of a welding-groove measurement system to within predetermined limits. It is possible to maintain the measurement accuracy of the system even when the rotational speed of the rotating device is changed.

In another aspect of the invention, the positioning device of the system may be a robot hat includes one movable arm or movable arms, and the welding-groove measuring sensor may be attached to a tip-end portion of the movable arm or movable arms. Thereby, the welding-groove measuring sensor can be easily moved to a suitable position to measure the three-dimensional welding groove position.

In another aspect of the invention, in the system, the welding object may be the other cylindrical thin member that is over-lapped fillet welded to an inside of the one thin member, and the welding-groove measuring sensor may be the welding groove measuring apparatus.

In another aspect of the invention, the system may be configured to measure the welding-groove position on the welding-groove face located at an end portion of a cylindrical welding object in the axial direction. The system may include an installation stand on which the welding object is placed so that an axial center of the welding object aligns with a predetermined line perpendicular to the installation stand. The system may also include a welding-groove measuring sensor for projecting a slit light or a scanning spot light on the welding object so that it crosses the welding-groove face of the welding object on the installation stand, capturing a projected light image on the welding object, and measuring the three-dimensional welding groove position based on the projected light image. The system may also include a sensor rotating device for supporting the welding-groove measuring sensor and positioning the welding-groove measuring sensor in a position at which the welding-groove measuring sensor can measure the three-dimensional welding groove position, and rotating or revolving the welding-groove measuring sensor on the predetermined line (i.e., the axial center of the welding object). The system may also include a sensor rotational-angle measuring device for measuring a sensor rotational angle on the predetermined line (i.e., the rotational axis of the sensor rotating device). The system may also include a third reception module for communicatively coupling with the welding-groove measuring sensor and the sensor rotational-angle measuring device, and for receiving the three-dimensional welding groove position from the welding-groove measuring sensor and the sensor rotational angle from the sensor rotational-angle measuring device, simultaneously, at a predetermined time interval. The system may also include a second buffer for storing the sensor rotational angle with a second receiving time received by the third reception module while associating the sensor rotational angle with the second receiving time. The system may also include a phase-delay correcting module for calculating a sensor rotational angle stored in the second buffer at a time before a phase-delay time from the second receiving time as a corresponding sensor rotational angle. The phase-delay time is a phase-delay time of the three-dimensional welding groove position with respect to the sensor rotational angle that is generated according to the rotational speed of the sensor rotating device and the image-processing speed of the welding-groove measuring sensor. The system may also include a conversion module for converting the three-dimensional welding groove position from a coordinate system of the sensor rotating device into a coordinate system that uses the axial center of the welding object as a base axis.

With this configuration, the system includes a sensor rotating device for rotating the welding-groove measuring sensor with respect to the welding object, instead of rotating the welding object. In some embodiments, the welding object is cylindrical, as described above. In addition, since the system includes the phase-delay correcting module and the conversion module, it is possible to measure the welding-groove position quickly with accuracy, as described above.

In another aspect of the invention, the system may also include a second interpolation module for interpolating an intermediate three-dimensional welding groove position corresponding to an intermediate angle between the corresponding sensor rotational angles based on the corresponding sensor rotational angles and the corresponding three-dimensional welding groove positions. According to this configuration, it is possible to measure the welding-groove position quickly with accuracy, as described above.

In another aspect of the invention, the system may also include a module for determining whether or not a variation of the three-dimensional welding groove positions between the corresponding sensor rotational angle at a certain time and the corresponding sensor rotational angle at a time before the certain time is greater than a predetermined value, based on the corresponding sensor rotational angles and the corresponding three-dimensional welding groove positions. The system may also include a module for grouping the three-dimensional welding groove positions in which variation is greater than the predetermined value and determined as an abnormal value. The system may also include a second determination module for determining that the three-dimensional welding groove position belonging to a group with the most number of the three-dimensional welding groove positions is normal. The abnormal three-dimensional welding groove position may be interpolated based on the normal three-dimensional welding groove positions and the corresponding sensor rotational angles. According to this configuration, it is possible to measure the welding-groove position quickly with accuracy, as described above.

In another aspect of the invention, the system is directed to a condition in which the welding-groove positions of a plurality of welding objects are measured one by one. The system may include a fourth reception module for receiving a user input relating to a change in a type of the welding object. The system may also include a second average/dispersion calculation module for calculating an average value and a dispersion value of a plurality of three-dimensional welding groove positions corresponding to one corresponding sensor rotational angle of each welding object, based on the corresponding sensor rotational angles and the corresponding three-dimensional welding groove positions obtained for the plurality of welding objects. The system may also include a second rotational speed change module for instructing the rotating device to change the rotational speed based on the average values and dispersion values that are calculated one by one after the fourth reception module receives the user input. According to this configuration, it is possible to measure the welding-groove position quickly with accuracy, as described above.

In another aspect of the invention, the sensor rotating device of the system may be a robot that includes one movable arm or movable arms, and the welding-groove measuring sensor may be attached to a tip-end portion of the movable arm or movable arms. Thereby, the welding-groove measuring sensor can be easily moved to a suitable position to measure the three-dimensional welding groove position.

In another aspect of the invention, in the system, the welding object may be the other cylindrical thin member that is over-lapped fillet welded to an inside of the one thin member, and the welding-groove measuring sensor may be the welding groove measuring apparatus.

The above and further objects and features of the invention will more fully be apparent from the following detailed description with accompanying drawings.

DETAILED DESCRIPTION OF THE INVENTION

Figure 1:
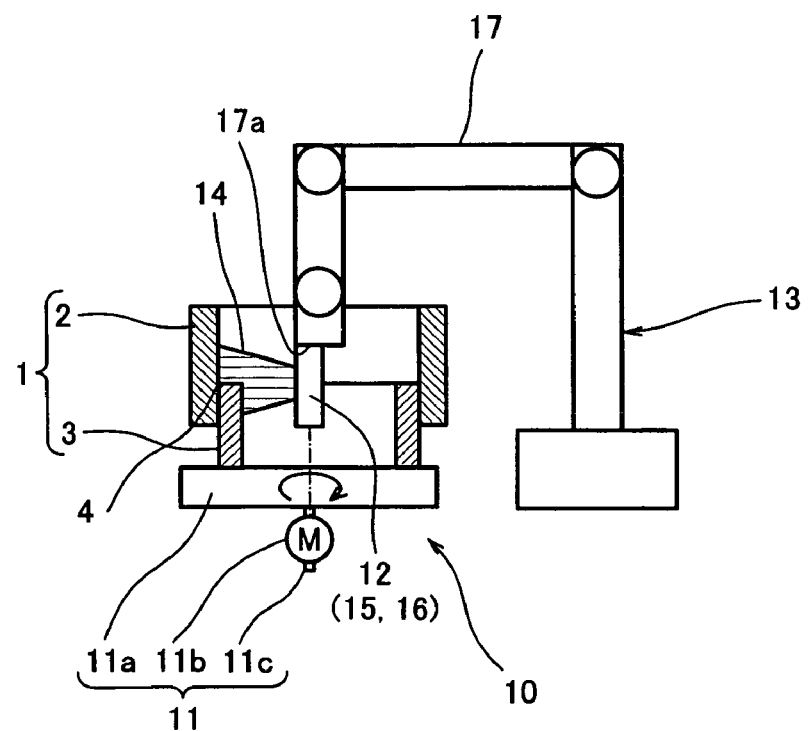
FIG. 1 is a schematic view showing a configuration of a welding-groove measurement system according to one embodiment of the invention.

FIG. 1 is a schematic view showing a configuration of a welding-groove measurement system according to one embodiment of the invention. As shown in FIG. 1, a measuring object 1 typically includes two hollow cylindrical members with different diameters. Typical examples of these members are a rim and a disk of an automobile wheel. The cylindrical member 3 of a smaller diameter (hereinafter, referred to as "a welding object") is fitted inside the cylindrical object 2 of a larger diameter, with an overlapped section which is designed to be fillet-welded to join the members together. The measuring object 1 may be any other suitable shape and is not limited to a cylindrical shape.

In this embodiment, the welding-groove measurement system 10 includes a rotating device 11 for rotating the measuring object 1, a welding-groove measuring sensor 12 for measuring a welding-groove position of the welding object 3, and a positioning device 13 that supports the welding-groove measuring sensor 12 and positions the sensor 12 in a position at which a measurement of the welding-groove position is possible by the sensor 12.

The rotating device 11 typically includes a rotary table 11a on which the measuring object 1 is placed, and a driving device 11b for rotating the rotary table 11a. The rotary table 11a is formed of a size such that it is large enough to place the measuring object 1 thereon. On this rotary table 11a, the cylindrical measuring object 1 is placed so that it aligns coaxial with the rotary table 11a. That is, the measuring object 1 rotates on the rotational axis of the rotary table 11a.

The rotating device 11 also includes a rotational-angle measuring device 11c for measuring a rotational angle of the rotary table 11a (that is, the rotational angle of the measuring object 1 on the axial canter of the measuring object 1).

The driving device 11b may preferably be a stepping motor, a servo motor, etc., to accurately control the rotation of the rotary table 11a (i.e., the rotation of the measuring object 1).

The welding-groove measuring sensor 12 is arranged in a predetermined measurement position inside the measuring object 1 on the rotating device 11. The term, "predetermined measurement position" used herein refers to a position at which the welding-groove position of the welding object 3 can be measured.

Although not illustrated, the welding-groove measuring sensor 12 typically includes a light projecting device 15 and an image acquisition device 16. The light projecting device 15 is configured so that a slit light or a scanning spot light 14 may be projected over both cylindrical objects 2 and 3 across the welding groove 4 of the welding object 3. The image acquisition device 16 typically includes a three-dimensional calculating function, and is configured so that it captures an image of the light projected on the welding object 3, and calculates a three-dimensional position of the welding groove of the welding object 3 based on the captured image. The image acquisition device 16 is configured to output the three-dimensional groove position to an input device 18 of an operation device COM, which is typically a computing device.

As the welding-groove measuring sensor 12, a laser sensor, etc. may be used. In many cases, the laser sensor typically includes both the projection device 15 and the image acquisition device 16. The image acquisition device 16 may be any suitable camera device, including, but not limited to, CCD, CMOS components, etc.

The positioning device 13 may be any suitable articulated robot, etc., and includes a plurality of movable arms 17 in this embodiment, but is not limited thereto. The welding-groove measuring sensor 12 is attached to a tip-end portion 17a of the movable arms 17. Accordingly, the positioning device 13 is capable of moving the welding-groove measuring sensor 12 to the predetermined measurement position mentioned above.

In this embodiment, the welding-groove measuring sensor 12 is stationary at the predetermined measurement position, while the measuring object 1 is rotated with respect to the sensor 12. Alternatively, the welding-groove measuring sensor 12 may be rotated with respect to the measuring object 1 while the measuring object 1 may be stationary. In this case, the rotating device 11 is not needed and a stationary table may be used instead of the rotating device 11. Similarly to the earlier case, the measuring object 1 is placed coaxially with a predetermined center line of the stationary table. The center line is determined as being located at a predetermined center of the stationary table surface and substantially perpendicular to the table surface. A sensor rotating device for rotating the welding-groove measuring sensor 12 is provided to the tip-end portion of the arms 17. The sensor rotating device is configured to rotate or revolve the welding-groove measuring sensor 12 on the axial center of the measuring object 1. The rotation or revolution of the welding-groove measuring sensor 12 is selected beforehand to make it suitable to measure the welding-groove position of the welding object 3.

Next, referring to FIGS. 2-7, the operation device of the welding-groove measurement system 10 will be explained.

Figure 2:
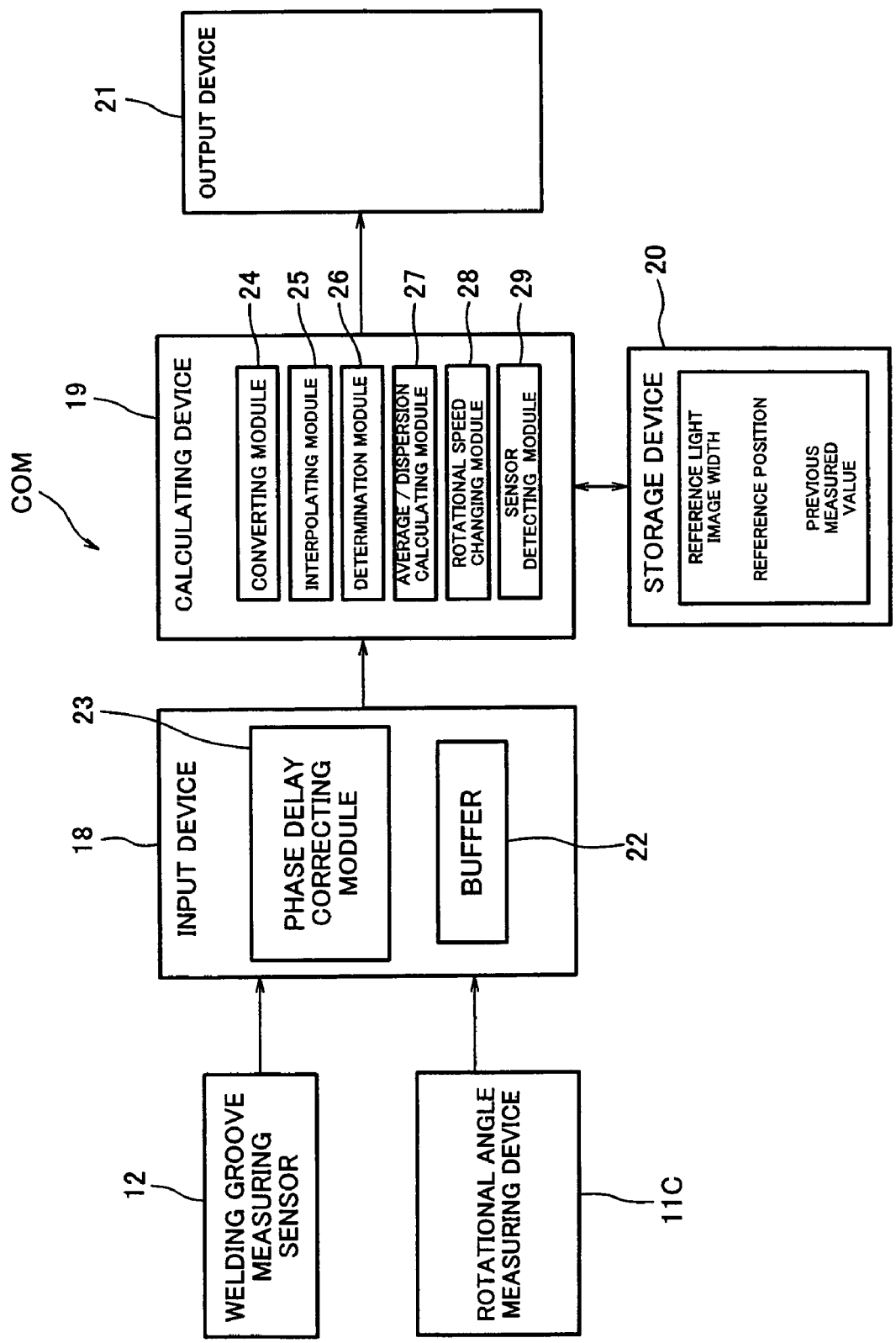
FIG. 2 is a block diagram showing a function of an operation device of the welding-groove measurement system shown in FIG. 1.

As shown in the block diagram of FIG. 2, the operation device COM typically includes an input device 18, a calculating device 19, a storage device 20, and an output device 21.

The input device 18 is communicatively coupled with the welding-groove measuring sensor 12 and the rotational-angle measuring device 11c. The input device 18 is configured so that it receives the three-dimensional welding groove position of the welding object 3 from the welding-groove measuring sensor 12 and the rotational angle of the rotary table 11a from the rotational-angle measuring device 11c, respectively, and simultaneously, at a predetermined time interval. The input device 18 typically includes a buffer 22 and a phase-delay correcting module 23. Although not illustrated, the input device 18 is configured so that it is possible to receive an input by a user, which indicates a change of the measuring object 1 from one type to another.

The buffer 22 stores the rotational angle received from the rotational-angle measuring device 111c along with a receiving time of the rotational angle. The phase-delay correcting module 23 calculates a corresponding rotational angle based on a phase-delay time and the rotational angle stored in the buffer 22. The corresponding rotational angle is defined as a rotational angle of the rotating device 11 at a time before the phase-delay time from the receiving time. The phase-delay time is defined as a phase-delay time of the three-dimensional welding groove position that may be affected by the rotational speed of the rotating device 11 and an image-processing speed of the welding-groove measuring sensor 12, with respect to the rotational angle. Accordingly, by correcting the rotational angle with the phase-delay time using the buffer 22, it is possible to cancel the phase delay between the three-dimensional welding groove position and the rotational angle. With the configuration above, it is possible to measure the welding-groove position of the welding object 3 more quickly and accurately than conventional methods.

Figure 3:
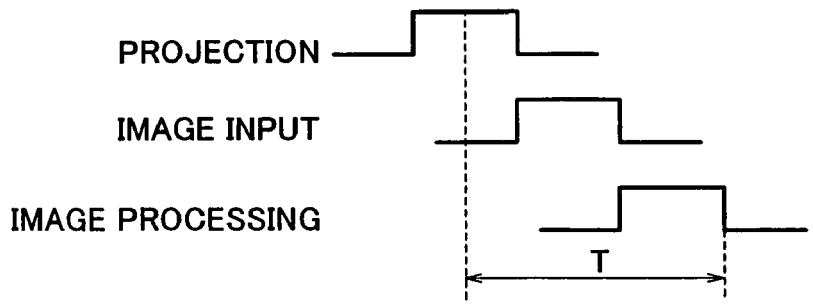
FIG. 3 is a explanatory diagram explaining a phase-delay time.

Hereinbelow, the above-mentioned phase-delay time will be explained in detail referring to FIG. 3. As shown in FIG. 3, the image acquisition device 16 typically requires a time T to complete an image processing operation through an image input from the light projection. Due to the delay time T, with respect to the rotational angle that is an input, the three-dimensional welding groove position (that is, a control output that may include image information) as an operation result is also delayed, and causes a blur in the image. Due to the blur, the three-dimensional welding groove position typically is acquired at some intermediate time within the time required for the light projection over the welding-groove position of the welding object 3. For example, it is typically at the 2.5th frame from the start of the image input, and this is equivalent to approximately 40 msec when a clock speed of the image acquisition device is 30 Hz, or approximately 80 msec when 60 Hz. Especially when measuring the welding-groove position of the welding object 3 with a higher speed of rotation of the measuring object 1, the time T appears to be even greater. Accordingly, the time T is referred to as the "phase-delay time."

Referring back to FIG. 2, the calculating device 19 may include, but not limited to, a Central Processing Unit or CPU, etc. This calculating device 19 typically includes a converting module 24, an interpolating module 25, a determination module 26, an average/dispersion calculating module 27, a rotational speed changing module 28, and a sensor malfunction detecting module 29.

The converting module 24 is configured so that it converts the three-dimensional welding groove position of the welding object 3 from a coordinate system of the positioning device 13 into a coordinate system in which the axial center of the welding object 3 is used as a base axis. The converted three-dimensional welding groove position of the welding object 3 may be used in external devices, such as controllers of welding robots (not shown), for example. In order to use the three-dimensional welding groove position for the welding robots, the three-dimensional welding groove position is further converted from the coordinate system of the welding object 3 into a coordinate system of the welding robot, based on a relative physical relationship between a reference point of the coordinate system of the welding object 3 and a reference point of the coordinate system of the welding robot. Comparing with a direct conversion in which the three-dimensional welding groove position of the welding object 3 is converted from the coordinate system of the positioning device 13 into the coordinate system of the welding robot, this stepped conversion improves accuracy of the total conversion. This is because a distance between the welding object 3 and the welding robot is shorter than a distance between the positioning device 13 and the welding robot.

Figure 4:
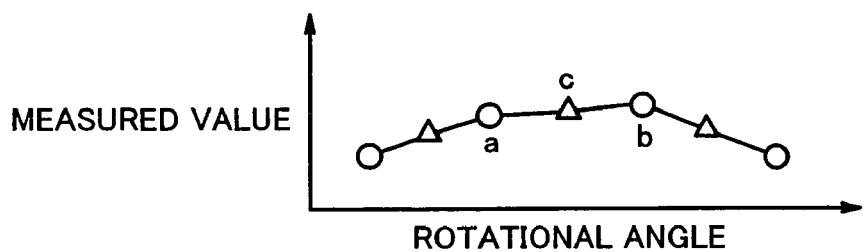
FIG. 4 is a graph showing a relationship between measured values (converted three-dimensional welding groove positions) and a corresponding rotational angle.

The interpolating module 25 is configured so that it interpolates the three-dimensional welding groove positions based on the corresponding rotational angles of the rotary table 11a and the three-dimensional welding groove positions of the welding object 3 corresponding to the corresponding rotational angles. Detailed explanation of this interpolation will follow with reference to FIG. 4. FIG. 4 shows a graph showing a relationship between measured values (i.e., the three-dimensional welding groove positions converted by the converting module 24) and the corresponding rotational angles of the rotary table 11a. In this graph, circles indicate the measured values while triangles indicate the interpolated values.

For example, if a corresponding rotational angle at a measuring point "a" in FIG. 4 is set to as θa, and a measured value at the same point is set to as Ya. Similarly, a corresponding rotational angle at a measuring point "b" in FIG. 4 is set to as θb, and a measured value at the same point is referred to as Yb. If a corresponding rotational angle at an interpolating point is set to as θc, the interpolated value Yc is calculated using the following equation (1).

$$Yc=Ya+(Yb-Ya)/(\theta b-\theta a) \quad (1)$$

By this equation, even when the number of the measuring points is less, it is possible to estimate a three-dimensional welding groove position of the welding object 3 corresponding to any desired intermediate rotational angle of the rotary table 11a, notwithstanding a rotating speed of the rotating device 11.

Figure 5:
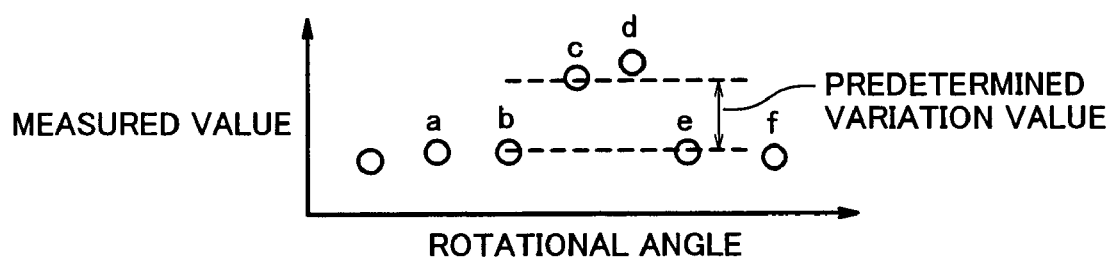
FIG. 5 shows a graph showing a relationship between the measured values (converted three-dimensional welding groove position) and a corresponding rotational angle.

In this embodiment, the determination module 26 shown in FIG. 2 is configured so that it determines whether or not the measured three-dimensional welding groove position of the welding object 3 is normal. Detailed explanation of this determination will follow with reference to FIG. 5. FIG. 5 is a graph showing a relationship between measured values (i.e., the converted three-dimensional welding groove positions) and corresponding rotational angles.

The determination module 26 typically compares the measured values corresponding to each adjacent measuring points, such as between the measuring points a and b, b and c, c and d, d and e, and e and f, shown in FIG. 5. That is, the determination module 26 may compare a measured value at a present measuring point (for example, the measuring point b) with a measured value at a previous measuring point (for example, the measuring point a) just before the present measuring point. In this embodiment, the measured value corresponding to the previous measuring point is stored in the storage device 20. In this embodiment, the determination module 26 determines that at least one of the measured values is abnormal when the variation of these measured values exceeds a predetermined variation value stored in the storage device 20. In the example of FIG. 5, the determination module 26 may determine the measured values between the measuring points b and c, and between the measuring points d and e are both abnormal. In this embodiment, the determination module 26 divides the measuring points "a" through "f" into groups in which the measured values are close to each other, and counts the number of the measuring points in each group. For example, if the measured value at the measuring point b is picked and, then, four measuring points a, b, e, and f are grouped in one group. Similarly, the measured value at the measuring point c may be picked and, then, two measuring points c and d may be grouped in one group. According to the number of measured values, the measuring points may be divided into more than two groups. The determination module 26 determines that measured values at the respective measuring points in a group having more number of the measuring points is normal. That is, for example in the above case of FIG. 5, the measured values at the measuring points a, b, e, and f are considered to be normal. The normal values for the measuring points c and d in the smaller number group are calculated by the interpolation module 25 using the interpolation technique mentioned earlier. The measured values corresponding to the measuring points c and d are calculated based on the corresponding rotational angles of the rotary table 11a corresponding to the measuring points b and e, and the measured values corresponding to the measuring points b and e, using the equation (1).

The average/dispersion calculating module 27 shown in FIG. 2 typically is configured so that, based on the corresponding rotational angles and the three-dimensional welding groove positions that are obtained from a plurality of the measuring objects 1 of the same type, an average value and a dispersion value of the three-dimensional welding groove positions corresponding to the same corresponding rotational angle of each welding object 3 are calculated. This way, it is possible to obtain the quality of the measuring object 1.

The rotational-speed changing module 28 is configured so that it gives the rotating device 11 an instruction to change the rotational speed based on the average value and the dispersion value which are calculated by the average/dispersion calculating module 27, when the input device 18 receives a user input relating to a change in a type of the product (i.e., the measuring object 1). When the dispersion value is small (i.e., when the variation of the measured values by the welding-groove measurement system 10 is small), the rotational speed changing module 28 outputs instructions to increase the rotational speed of the rotating device 11. On the contrary, when the dispersion value is large (i.e., when the variation of the measured values of the welding-groove measurement system 10 is large), the rotational speed changing module 28 outputs instructions to decrease the rotational speed of the rotating device 11. For example, the variation in the measured values of the welding-groove measurement system 10 may become large immediately after changing the type of the welding object 3, if the number of measuring points is still small. In such case, the rotating device 11 is rotated at a relatively low speed. Then, the rotational speed is increased, as the number of the measuring points increases and the variation in the measured values of the welding-groove measurement system 10 becomes smaller. By the above rotational speed change, it is possible to maintain the measurement accuracy of the welding-groove measurement system 10. Further, it may be possible to shorten the measurement time of the welding-groove measurement system 10, while maintaining the measurement accuracy.

Figure 6:
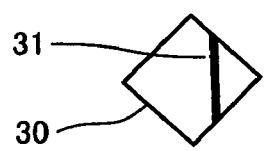
FIG. 6 is an elevational view of a calibration plate.

The sensor-malfunction detecting module 29 is configured so that it detects a misalignment of the attachment position of the welding-groove measuring sensor 12, as well as malfunctions of the sensor 12 itself. A calibration plate may be used as the sensor-malfunction detecting module 29. The calibration plate is typically used in order to calibrate a physical relationship of the welding-groove measuring sensor 12 with respect to the positioning device 13, when attached to the device 13. However, in this embodiment, the calibration plate is also used in order to detect the malfunctions of the sensor itself, as mentioned above. Hereinafter, the calibration plate 30 will be described in detail with reference to FIG. 6. FIG. 6 is an elevational view of one example of the calibration plate 30.

In this example, the calibration plate 30 is formed in a square-shaped board, as shown in FIG. 6. The calibration plate 30 is placed at a predetermined position within a detecting range of the welding-groove measuring sensor 12. The sensor-malfunction detecting module 29 is designed to carry out measurements at the same position at which the calibration plate 30 is placed, by using the welding-groove measuring sensor 12.

The welding-groove measuring sensor 12 projects a slit light 14 on the calibration plate 30, captures an image of the light 31 projected on the calibration plate 30, and measures a position of the light image 31. The sensor-malfunction detecting module 29 compares this measured position with a reference position stored in the storage device 20. When there is a difference between the measured position and the reference position, the sensor-malfunction detecting module 29 determines that the attached position of the welding-groove measuring sensor 12 is misaligned. The welding-groove measuring sensor 12 may also measure thickness of the light image 31, simultaneously. The sensor-malfunction detecting module 29 compares the measured thickness with the reference width of the light image stored in the storage device 20. When there is a difference between the measured width and the reference width, the sensor-malfunction detecting module 29 determines that there are malfunctions of the sensor itself, such as a decrease in output of the slit light 14 projected from the projection device 15, or a reduction in light-sensitivity due to a blot on the sensor lens (not shown) of the image acquisition device 16. The determination results are reported to the user so that the user can carry out an adjustment of the attached position of the welding-groove measuring sensor 12, an adjustment of the output of the projection device 15, lens cleaning of the photography device 16, etc., to maintain the welding-groove measuring sensor 12 at a normal state.

The storage device 20 may include a ROM, RAM, etc. The storage device 20 may also store data, computer programs, etc. required for the operation of the calculating device 19.

The output unit 21 shown in FIG. 2 may be communicatively coupled with controllers of external devices, such as the welding robots (not shown), so that it outputs results calculated by the calculating device 20 (i.e., the three-dimensional welding groove position of the welding object 3) to the external device.

Figure 7:
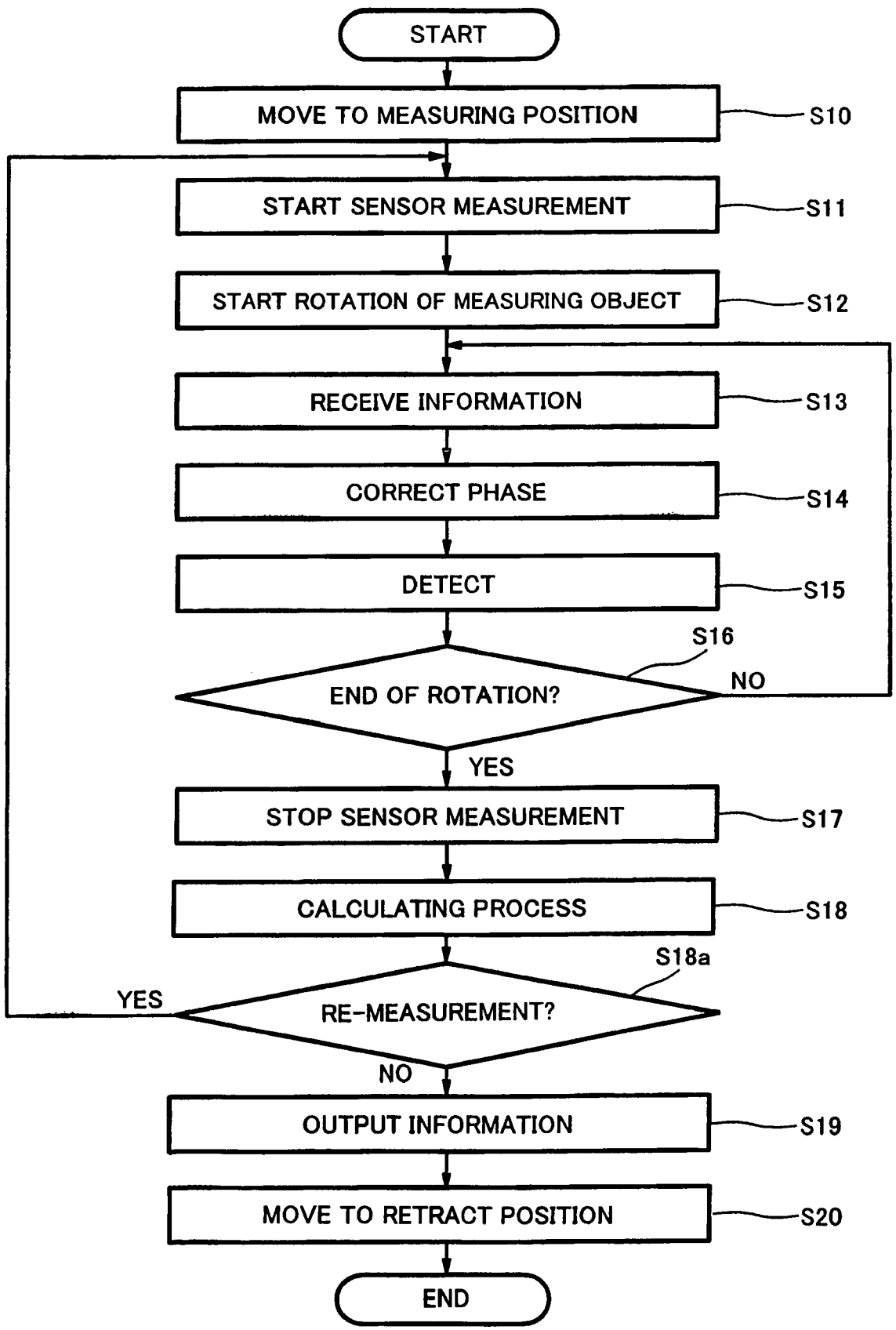
FIG. 7 is a flowchart showing processes of the welding-groove measurement system according to the present invention.

Hereinafter, a process flow of the welding-groove measurement system 10 configured as mentioned above will be explained in detail referring to FIG. 7.

First, the positioning device 13 moves the welding-groove measuring sensor 12 to a predetermined measurement position (Step S10). Then, the welding-groove measuring sensor 12 starts a measurement (Step S11). Then, the rotating device 11 rotates the measuring object 1 (Step S12). Alternatively as mentioned above, the welding-groove measuring sensor 12 may be rotated by the sensor rotating device attached to the tip-end portion of the arms 17 of the positioning device 13. Then, the input device 18 receives the three-dimensional welding groove position of the welding object 3 from the welding-groove measuring sensor 12, and the rotational angle from the rotational-angle measuring device 11c (Step S13). Then, the system 10 stores the rotational angle in the buffer 22, carries out the phase-correction by the phase-delay correcting module 23, and transmits the phase-corrected rotational angle to the calculating device 19 (Step S14). Then, the determination module 26 detects whether or not an abnormal value is included in the measured three-dimensional welding groove position (Step S15). Then, the system 10 determines whether or not the rotation of the measuring object 1 is completed (Step S16). That is, for example, one complete rotation is defined as the measuring object 1 being rotated 360 degrees on the axial center thereof, by the rotational-angle measuring device 11c. When the system 10 determines that the rotation of the measuring object 1 is not completed in Step S16 (Yes), it returns to Step S13.

When the system 10 determines that the rotation of the measuring object 1 is completed in Step S16 (No), it stops the measurement by the welding-groove measuring sensor 12 (Step S17). Then, the determination module 26 extracts the normal three-dimensional welding groove position(s) among the measured three-dimensional welding groove positions (Step 18). Then, the system 10 determines whether or not many (more than a predetermined number) abnormal values are extracted from the measured values (Step 18a). When many abnormal values are extracted, the system 10 returns to Step S11 for re-measurement (Yes at Step S18a). It is desirable to reduce the rotational speed when performing the re-measurement. When not many abnormal values are extracted (No at Step S18a), the interpolating module 25 performs the interpolation process of the three-dimensional welding groove position of the welding object 3 between the desired corresponding rotational angles of the rotary table 11a, based on the normal three-dimensional welding groove position(s).

Then, the converting module 24 converts the interpolated three-dimensional welding groove position into the coordinate system in which the axial center of the welding object 3 is used as the base axis, from the coordinate system of the positioning device 13 (Step S18). Then, the output device 21 outputs the converted three-dimensional welding groove position to the external devices, such as welding robots (Step S19). Then, the positioning device 13 moves the welding-groove measuring sensor 12 to the retracted position outside the measuring object 1 (Step S20). The above processes are repeatedly carried out for each of the measuring objects 1 which is transported into a place for the measurement one by one.

Alternatively, the welding-groove measuring sensor 12 may not be limited to the configurations described above, and may be configured in any other various forms such as follows. Another example of the welding-groove measuring sensor 12 will be described in detail referring to FIGS. 8 to 14. Here, similar elements and components used in the welding-groove measuring sensor 12 mentioned above may also be used with similar reference numerals, without further explanations.

Figure 8:
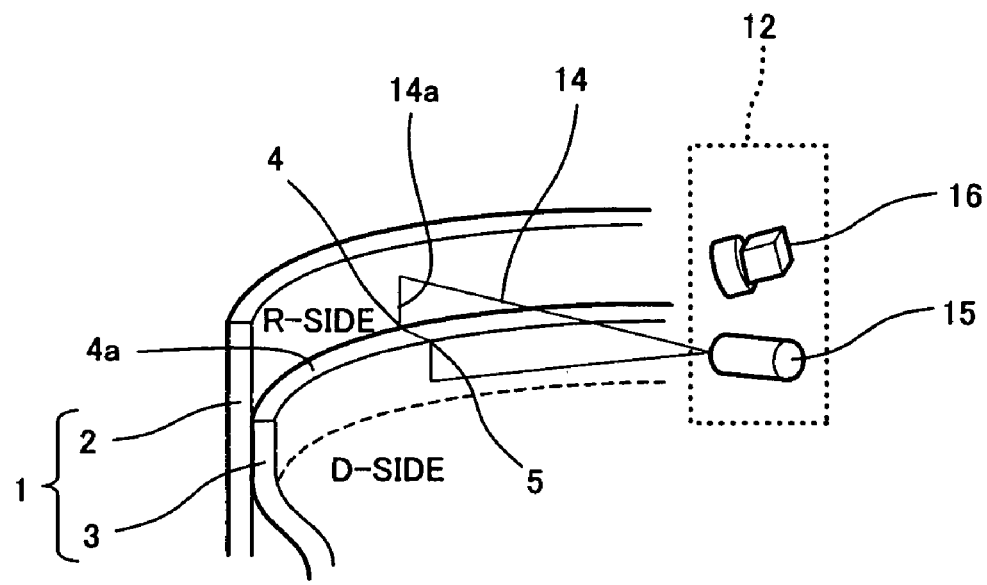
FIG. 8 is a schematic perspective view showing an example of a physical relationship between a welding-groove measuring sensor and work pieces to be measured.
Figure 9:
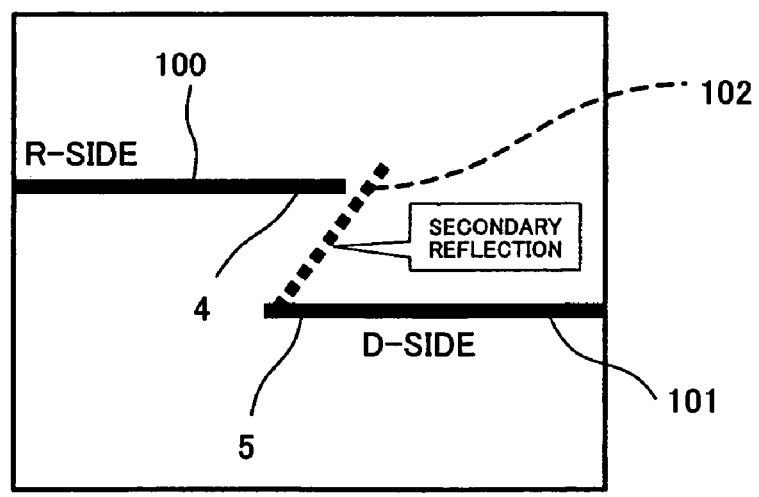
FIG. 9 shows an example of two-dimensional image acquired by an image acquisition device.

FIG. 8 is a schematic perspective view showing an example of physical relationship between the welding-groove measuring sensor 12 and the measuring object 1. In this embodiment, as shown in FIG. 8, the measuring object 1 includes two cylindrical objects 2 and 3 arranged in a state in which an over-lapped fillet welding can be carried out. The welding-groove measuring sensor 12 includes a projection device 15 and an image acquisition device 16. As shown in FIG. 8, the projection device 15 is configured so that it projects a slit light 14 toward an inside surface of the cylindrical measuring object 1 (i.e., an inner circumferential area including a welding groove 4 of the cylindrical objects 2 and 3 in this example) to form a slit-light image 14a across the welding groove surface 4a. In this embodiment, the image acquisition device 16 is arranged so that it has an angled line-of-sight with respect to the projection device 5, to capture an image 14a of the slit light 14 (such as shown in FIG. 9). The projection device 15 and the image acquisition device 16 are configured so that they are moved by the positioning device 13 along the welding-groove face 4a. For facilitating explanation, an inner side of the outer cylindrical member 2 with larger diameter is referred to as "R-side", and the inner side of the inner cylindrical member (hereinafter, referred to as "a welding object") 3 with smaller diameter is referred to as "D-side." A reference numeral "5" indicates a convex or inner corner portion of the welding-groove face 4a.

FIG. 9 shows an example of the two-dimensional image of the slit-light image 14a captured by the image acquisition device 16. As shown in FIG. 9, this two-dimensional image includes a slit-light image 100 projected on the R-side surface (hereinafter, referred to as "a R-side image"), and a slit-light image 101 projected on D-side surface (hereinafter, referred to as "a D-side image") which is spaced apart from and in parallel with the R-side image 100.

However, in this image, the end point of the R-side image 100 on the side of the welding groove 4 appears to be offset from the groove 42. This is a phenomenon which may happen typically when a gap width of the welding groove of the measuring object 1 is relatively large. Moreover, in this two-dimensional image, the end point of the D-side, image 100 is offset from the true position of the corner portion 5. This is a phenomenon that may happen typically when a burr, etc., exists in the corner portion 5. Typically, in the two-dimensional image, the slit-light image 102 may not clearly appear. Therefore, the image 102 is shown with a dashed line in FIG. 9. Typically, this happens under the influence of secondary reflection from the inner surface of the measuring object 1.

The welding-groove measuring sensor or device 12 of this embodiment is configured to be capable of resolving the problems, and hereinafter, this will be described in detail.

Figure 10:
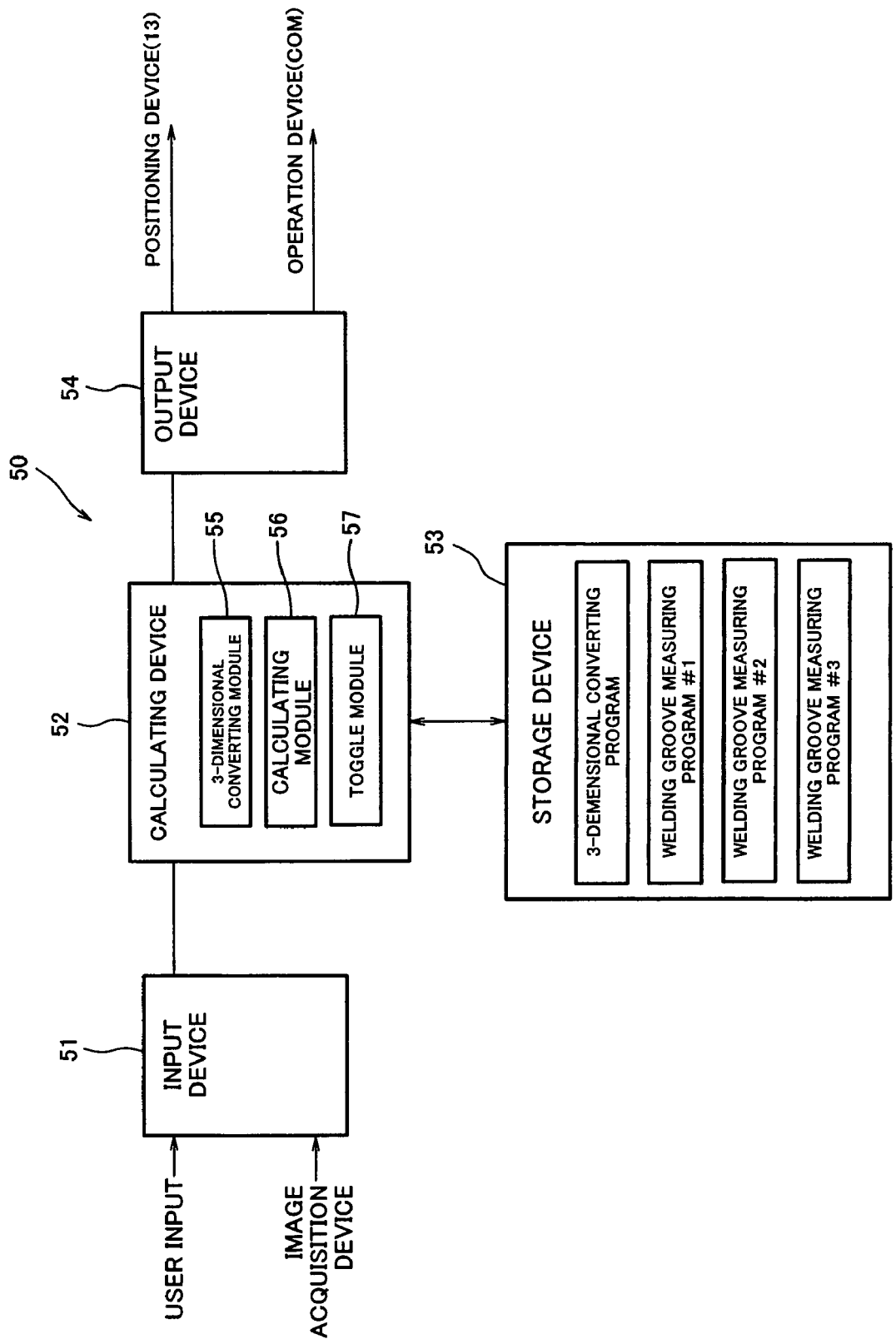
FIG. 10 is a block diagram showing a configuration of the operation device of the welding groove measuring apparatus according to another embodiment of the invention.

FIG. 10 is a block diagram showing a configuration of an operation device 50 which is included in the welding groove measuring apparatus 12 (see FIG. 2).

As shown in FIG. 10, the operation device 50 typically includes an input device 51, a calculating device 52, a storage device 53, and an output device 54. These devices 51-54 are communicatively coupled with each other.

The input device 51 may be communicatively coupled with the image acquisition device 16 (see FIG. 8), and the input device 51 may be configured so that it receives the slit-light image 14a as the two-dimensional image captured by the image acquisition device 16. The input device 51 may also be configured so that it receives a user input, and hereinafter, this will be described in detail.

The calculating device 52 may be, but is not limited to, a Central Processing Unit or CPU. The calculating device 52 may include a three-dimensional converting module 55, a calculating module 56, and a toggle module 57.

The three-dimensional converting module 55 is configured so that it converts the two-dimensional image obtained through the input device 51 into a three-dimensional image using predetermined three-dimensional conversion parameter(s). Hereinafter, this conversion will be explained in detail referring to FIG. 11.

Figure 11:
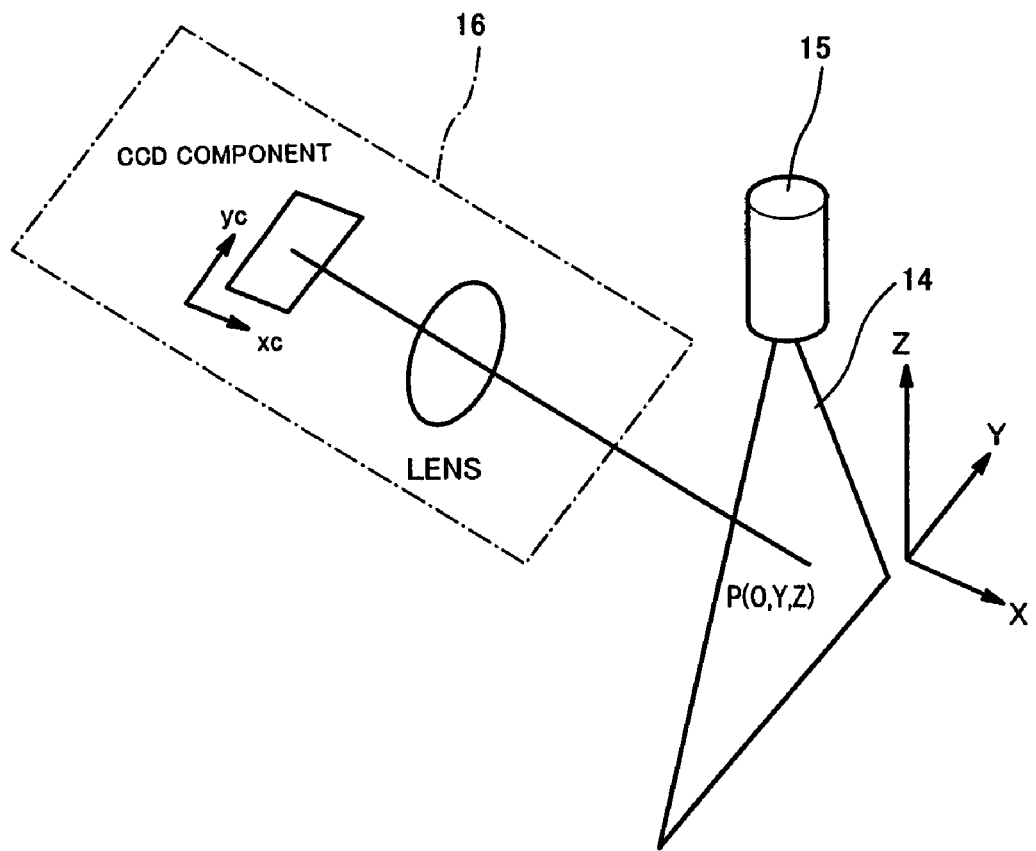
FIG. 11 is a view showing the three-dimensional conversion.

As shown in FIG. 11, for example, if the projection device 215 is configured to project the light perpendicularly to a projecting surface, the two-dimensional image can be converted into the three-dimensional image using the following equations (2)-(4). Here, the projecting surface is set as X=0.

$$[Y,Z] = A^{-1} \cdot B \tag{2}$$

Here, $$B = [C_{14} - Xc \ C_{24} - Yc] \tag{3}$$

$$A = \begin{Bmatrix} C_{32} \cdot Xc - C_{12} & C_{33} \cdot Xc - C_{13} \\ C_{32} \cdot Yc - C_{22} & C_{33} \cdot Yc - C_{23} \end{Bmatrix} \tag{4}$$

Here, Xc and Yc in the equations (3) and (4) represent the coordinates of the image acquisition device 16 such as a CCD component. Moreover, Cij represents the three-dimensional conversion parameters (also referred to as camera parameters). The camera parameters Cij may be set according to a relative physical relationship between the projection device 15 and the image acquisition device 16, and the parameters may be stored in the storage device 53. Typically, the camera parameters Cij may be obtained by measuring the coordinates of these devices 15 and 16 in the X-Y-Z coordinate system shown in FIG. 11.

The calculating module 56 shown in FIG. 10 is configured so that a welding-groove position is calculated based on the three-dimensional image and the relative physical relationship defined according to the shape and arrangement of the measuring object 1. Here, the relative physical relationship between three-dimensional images is defined as a relationship in which when the welding-groove face 4a is perpendicular or inclined to the R-side and D-side of the measuring object 1, the R-side image 100 or an extension thereof and the D-side image 101 or an extension thereof, as shown in FIG. 9, are also perpendicular or inclined to the slit-light image projected on the welding-groove face 4a or an extension thereof.

s shown in FIG. 10, in this embodiment, the toggle module 57 is configured so that it automatically chooses a suitable method among predetermined welding groove measurement methods (such as described above) that are preset for various types of the measuring objects 1, and switches to the chosen method. Those methods are associated with the patterns of the relative physical relationship between the three-dimensional images, and stored in the storage device 53 as the welding groove measurement programs #1-#3. The number of the programs may be any suitable number. Typically, the storage device 53 may include, but is not limited to, RAMs, ROMs, etc.

The toggle module 57 chooses one of the programs #1-#3 corresponding to the relative physical relationship based on a user input received through the input device 51, and switches to the chosen program. The user input may be, but is not limited to, a number which corresponds to the numbering system of the welding groove measurement programs as shown in FIG. 10, such as #1, #2, #3, etc.

The output device 54 is configured so that it outputs a calculated result of the calculating module 52 (i.e., the three-dimensional welding groove position) to the operation device COM, for example. The output unit 54 may also be communicatively coupled with the positioning device 13. The output device 54 is configured so that it sends an instruction to the positioning device 13 to operate the projection device 15 and the image acquisition device 16 in a suitable angled posture with respect to the welding-groove face 4a based on the program selected by the toggle module 57.

Next, the welding groove measurement programs corresponding to the relative physical relationship will be described in detail with reference to FIGS. 12-14.

Figure 12:
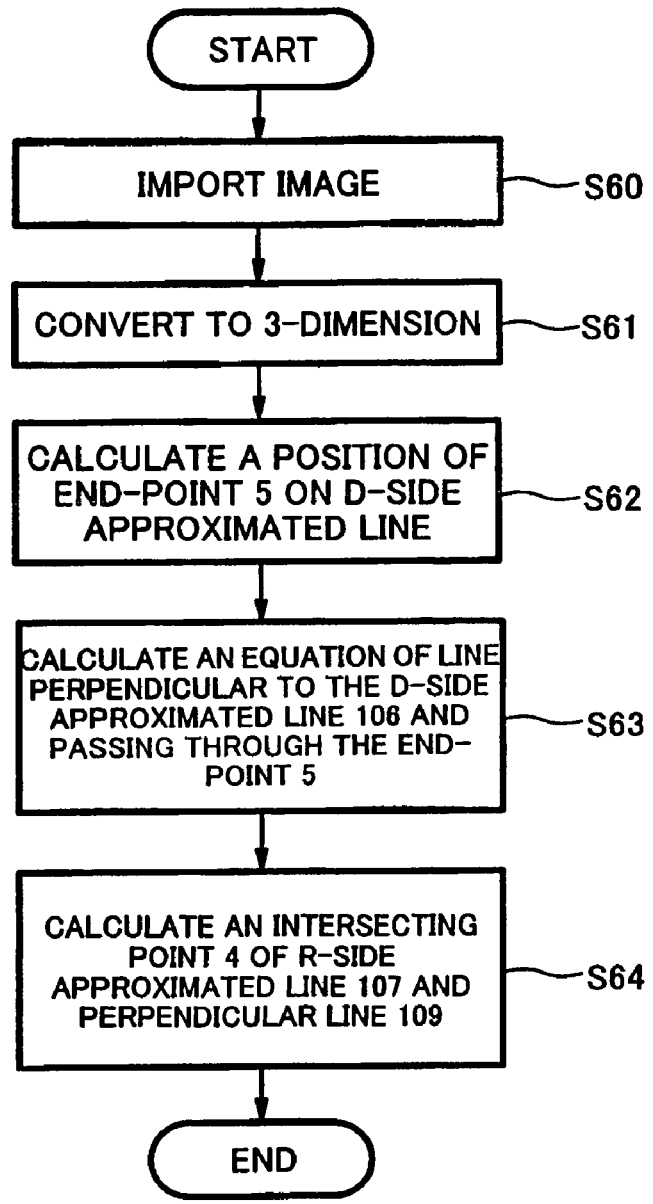
FIG. 12 is a flowchart showing processes of a first welding groove measurement program.
Figure 13:
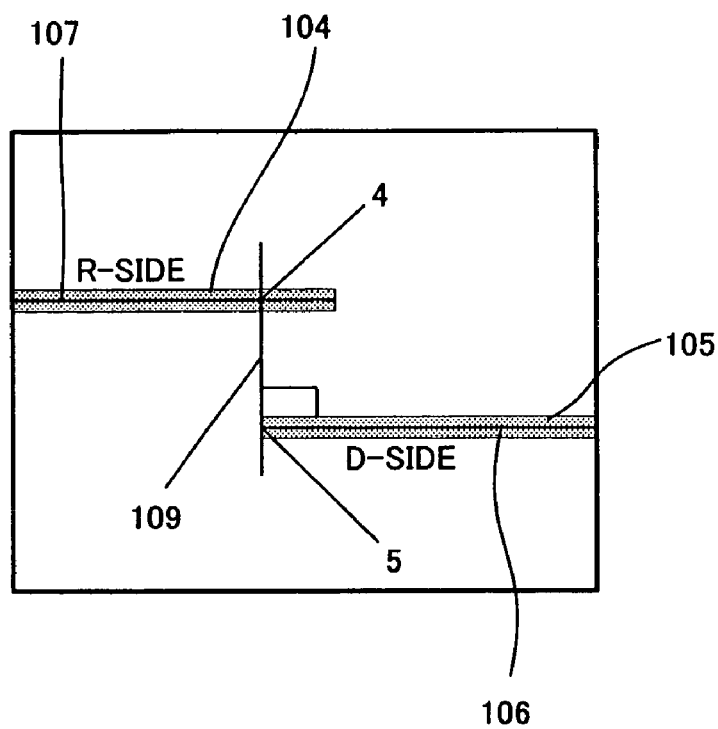
FIG. 13 is a view showing an example of the two-dimensional image acquired by the image acquisition device.

FIG. 12 is a flowchart showing processes of the welding groove measurement program #1, and FIG. 13 shows an example of the two-dimensional image captured by the image acquisition device 16 using the program #1.

In this embodiment, the welding groove measurement program #1 is applied when the welding-groove face 4a is oriented substantially perpendicular to the R-side and the D-side of the measuring object 1, and especially when the corner portion 5 of the welding-groove face 4a and the end point of the D-side image 105 are substantially matched. Therefore, the same reference numerals as the corner portion 5 is given to the end point. Further, the projection device 15 is arranged so that it projects the slit light 14 from substantially the same height as the welding-groove face 4a, where the line-of-sight of the slit light 14 is substantially parallel with the welding-groove face 4a (see FIG. 8).

As shown in FIG. 12, first, the image acquisition device 16 captures the R-side image 104 and the D-side image 105 as a two-dimensional image so that the these images 104 and 105 are spaced apart from each other by a predetermined distance and in parallel with each other, and can be shown in the same display screen (see FIG. 13) (Step S60).

Next, the three-dimensional converting module 55 converts the two-dimensional image into a three-dimensional image (Step S61).

The calculating module 56 performs a line approximation to the D-side image 105 in the three-dimensional image to calculate a line equation for an approximated straight line 106. Similarly, the calculating module 56 also performs a line approximation to the R-side image 104 in thee three-dimensional image to calculate an approximated straight line 107. Then, the calculating module 56 calculates a position of the end point 5 on the D-side approximated line 106 based on the equation for this line (Step S62).

Then, the calculating module 56 calculates an equation for a straight line 109 that is substantially perpendicular to the D-side approximated line 106 and passes through the end point 5 (Step S63).

Then, the calculating module 56 calculates a position of an intersecting point 4 of the R-side approximated line 107 and the perpendicular line 109, as a welding-groove position, based on the equations for the R-side approximated line 107 and the perpendicular line 109 (Step S64).

Next, the method of calculating equations for the R-side and D-side approximated lines and the perpendicular line, from the line images 104 and 105 in the three-dimensional image, will be described in detail. Upon calculating the approximated lines, any suitable well-known techniques, such as the Hough conversion method, may be used. The Hough conversion method is typically advantageous for this application because it utilizes a voting-technique to eliminate influences of noise data that is small in number. Specifically, an approximated line in Y-Z space in FIG. 11 may be detected by obtaining a point $(\rho, \theta)$ at which plots are concentrated in the virtual space $\rho\theta$. The approximated line can be expressed with an equation (5).

$$\rho = Y \cdot \cos\theta + Z \cdot \sin\theta \quad (5)$$

Thus, applying this equation to the approximated lines corresponding to the R-side and D-side images 104 and 105, these approximated lines 104 and 105 can be expressed by an equation (6).

$$a \cdot Y + b \cdot Z = c \quad (6)$$

An equation for a straight line perpendicular to the approximated line is given by an equation (7).

$$b \cdot Y - a \cdot Z = d \quad (7)$$

Although the above example shows a calculation of the straight line perpendicular to the straight line expressed by the equation (6), it is not limited to the perpendicular line. For example, the line may be any intersectable line expressed by the equation (6) at any angle.

Figure 14:
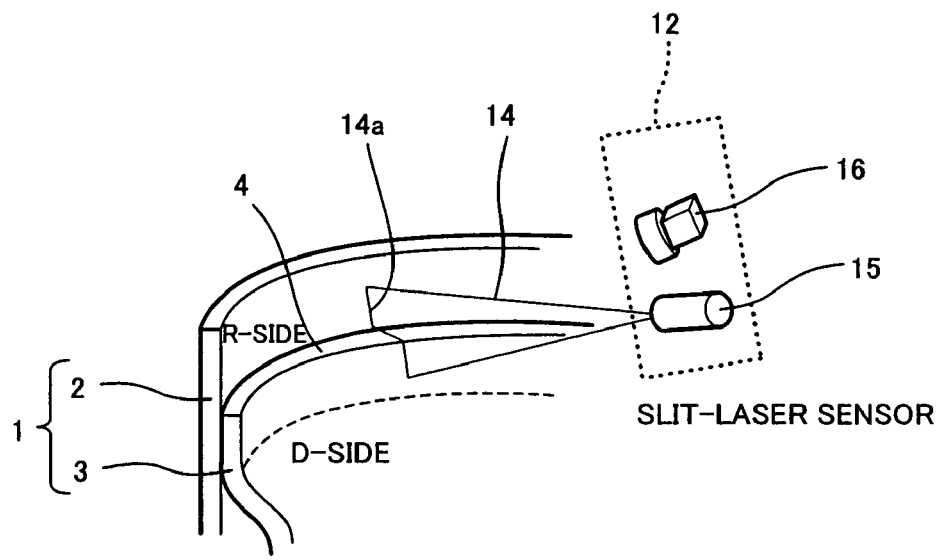
FIG. 14 is a schematic perspective view showing an example of a physical relationship between a welding-groove measuring sensor and work pieces to be measured.
Figure 15:
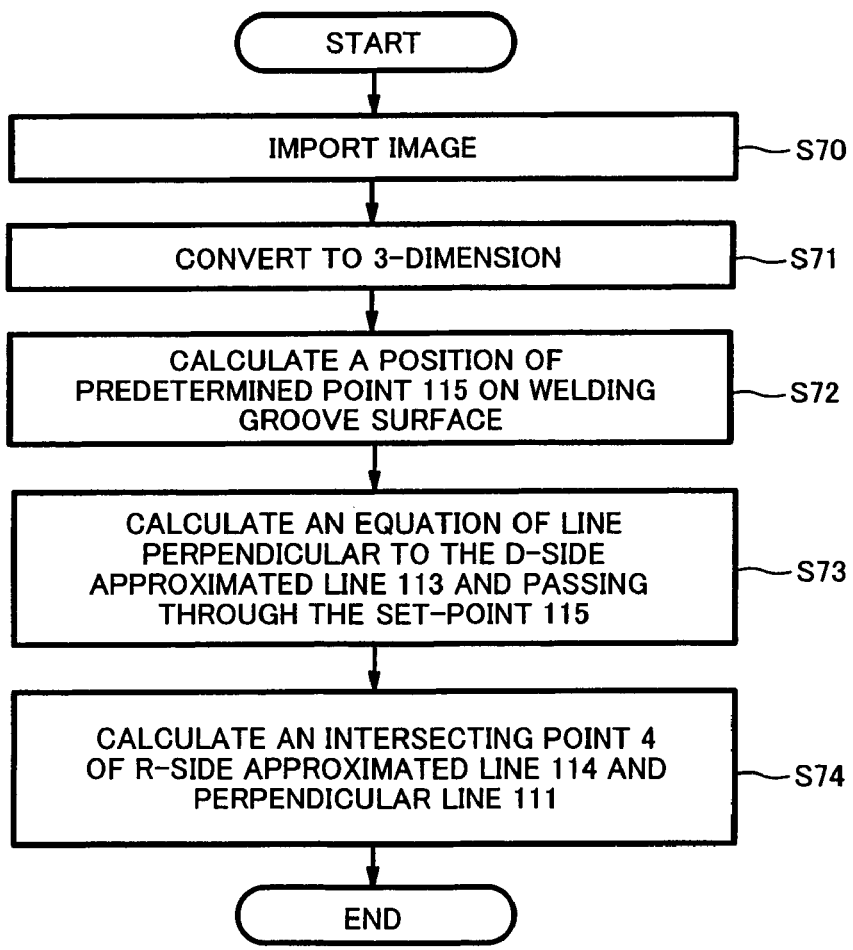
FIG. 15 is a flowchart showing processes of a second welding groove measurement program.
Figure 16:
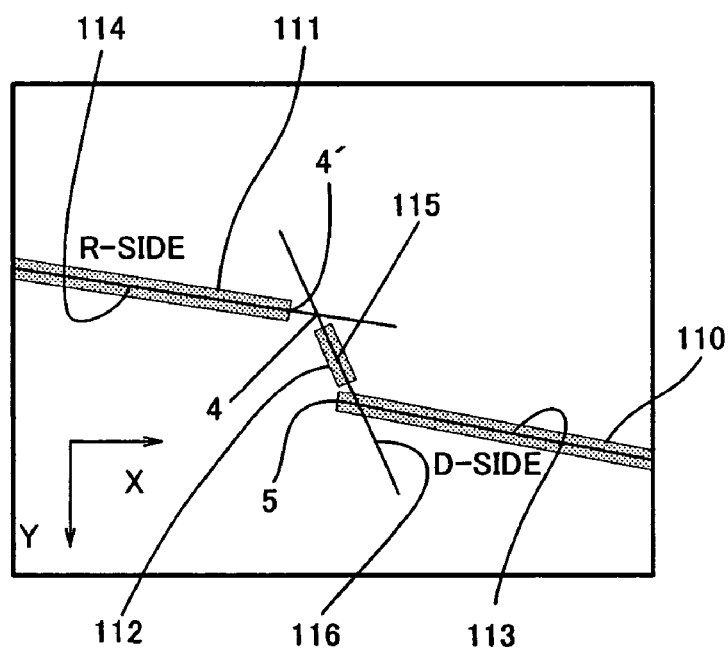
FIG. 16 shows an example of the two-dimensional image acquired by the image acquisition device.

FIG. 14 is a view showing an example of a physical relationship between the welding-groove measuring sensor 12 and the measuring object 1 according to the welding-groove measurement program #2. FIG. 15 is a flowchart showing processes of the program #2. FIG. 16 shows an example of a two-dimensional image captured by the image acquisition device 16 of the welding-groove measuring sensor 12.

The welding-groove measurement program #2 is applied when the welding-groove face 4a of the measuring object 1 is substantially perpendicular to the R-side surface and the D-side surface. In particular, the program #2 is applied when the corner portion 5 and the end point of the D-side image 110 is not substantially matched, under an influence of the gap width of the welding groove, or burr, slack, etc., in the corner portion 5. This program #2 may also be applied when the corner portion 5 and the end point of the D-side image 110 are matched. When applying the program #2, the projection device 15 is arranged so that it projects the slit light 14 from a higher position with respect to the welding-groove face 4a, as shown in FIG. 14.

As shown in FIG. 15, first, the image acquisition device 16 captures the D-side image 110 projected on the D-side surface of the measuring object 1, a R-side image 111 projected on the R-side surface, and a groove-face image 112 projected on the welding-groove face 4a, to acquire those images as two-dimensional images (Step S70). Here, the image acquisition device 16 is configured so that, upon capture, the D-side image 110 and the R-side image 111 can be shown spaced apart for a predetermined distance and in parallel with each other in the same display screen. Further, the image acquisition device 16 is configured so that the welding-groove face image 112 is arranged between the D-side image 110 and the R-side image 111 in the display screen.

Next, the three-dimensional converting module 55 converts the two-dimensional image into a three-dimensional image (Step S71).

The calculating module 56 calculates an equation for a straight line 113 that approximates the D-side image 110 in the three-dimensional image. Similarly, the calculating module 56 calculates an equation for a straight line 114 that approximates the R-side image 111 in the three-dimensional image. Further, the calculating module 56 calculates a position of a predetermined point 115 on the groove-face image 112 in the three-dimensional image (Step S72). A position of the predetermined point 115 is chosen so that it is not influenced by the gap width of the welding groove, or burr, slack, etc. of the corner portion 5, as mentioned above (typically, a middle region of the welding-groove face image 112). The predetermined point 115 may be chosen as, but not limited to, any point in the welding-groove face image 112. For example, the point 115 may be chosen as a point in the welding-groove face image 112 in the thickness direction of the welding-groove face 4a. Moreover, the point 115 may be a center-of-gravity of the welding-groove face image 112, based on brightness.

Then, the calculating module 56 calculates an equation for a straight line 116 that approximates the welding-groove face image 112, that is substantially perpendicular to the D-side approximated line 113, and passes through the predetermined point 115 (Step S73). Although in FIG. 16 the approximated straight line 116 does not appear to be perpendicular to the D-side approximated line 113, in fact these lines are three-dimensionally perpendicular to each other.

Next, the calculating module 56 calculates an intersecting point 4 of the R-side line 114 or an extension thereof and the groove-face line 116 or an extension thereof, as a welding-groove position based on the equations for these lines (Step S74).

Figure 17:
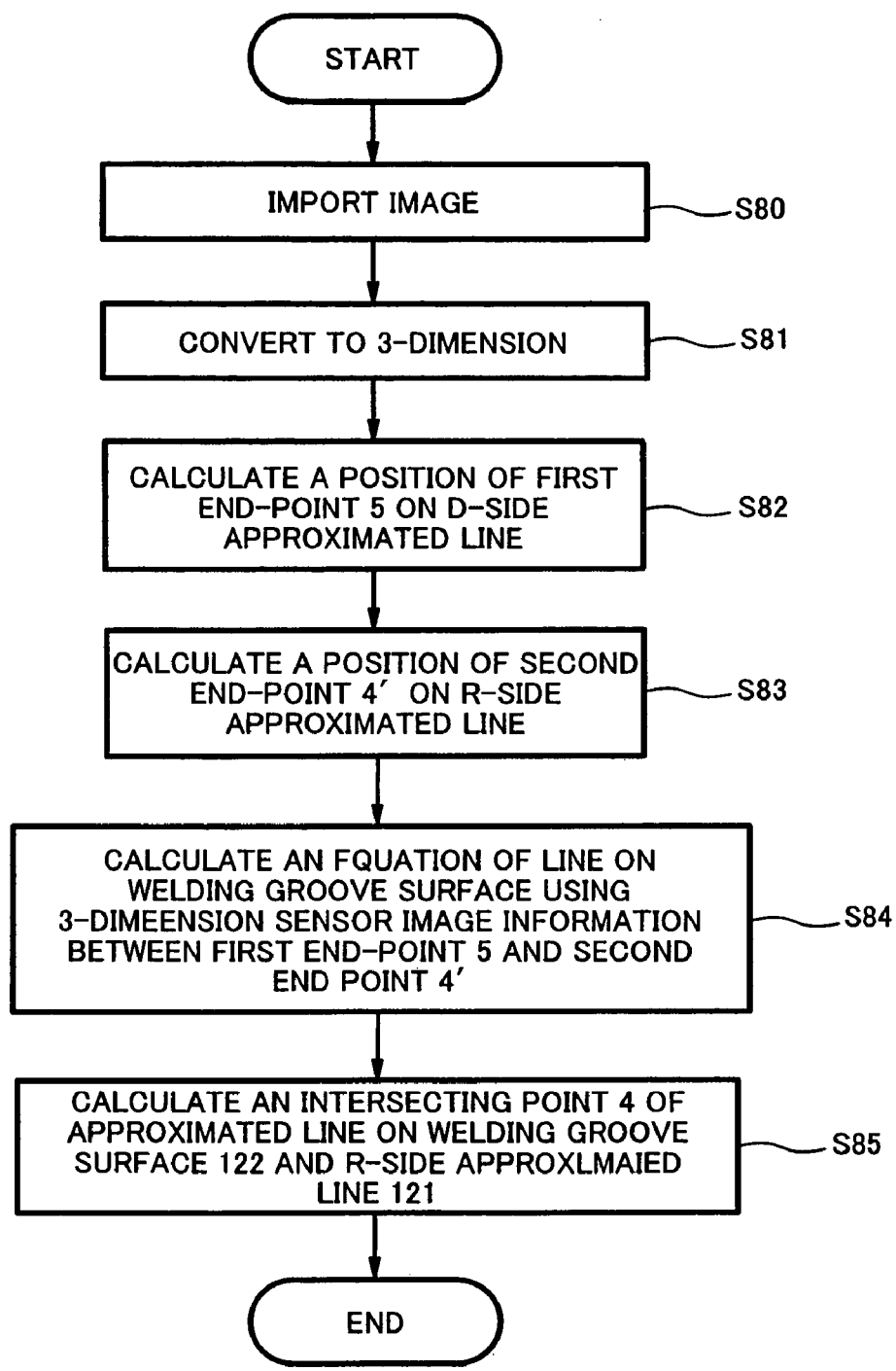
FIG. 17 is a flowchart showing processes of a third welding groove measurement program.
Figure 18:
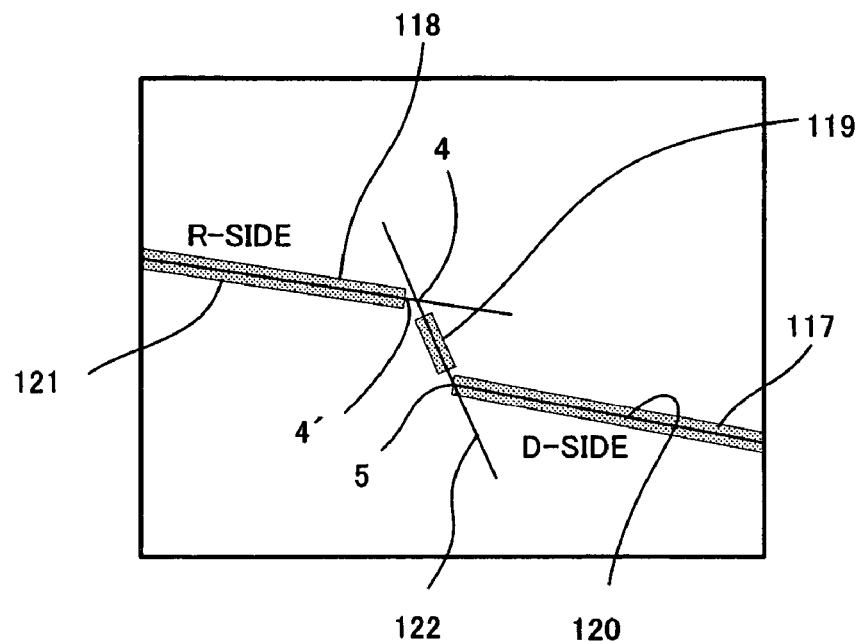
FIG. 18 is a view showing an example of the two-dimensional image acquired by the image acquisition device.

FIG. 17 is a flowchart showing processes of the welding-groove measurement program #3. FIG. 18 is an example of the two-dimensional image captured by the image acquisition device 16 when the welding-groove measurement program #3 is chosen.

The welding-groove measurement program #3 is applied when the welding-groove face 4a inclines to the R-side and D-side surfaces. In this case, as shown in FIG. 17, the projection device 15 projects the slit light 14 so that the slit light illuminates the welding-groove face 4a, as well as the R-side and D-side surfaces.

As shown in FIGS. 17 and 18, the image acquisition device 16 captures the D-side image 117, the R-side image 118, and the groove-face image 119 as the two-dimensional images (Step S80). In the two-dimensional image, the D-side image 117 and the R-side image 118 are arranged so that they are separated apart by a predetermined distance and substantially in parallel with each other in the same display screen. Further, in the two-dimensional image, the groove-face image 119 is arranged between the D-side image 117 and the R-side image 118 in the display screen.

Next, the three-dimensional converting module 55 converts the two-dimensional image into a three-dimensional image (Step S81).

Next, the calculating module 56 calculates an equation for a straight line 120 approximating the D-side image 117 in the three-dimensional image. Similarly, the calculating module 56 calculates an equation for a straight line 121 approximating the R-side image 118 in the three-dimensional image. Further, the calculating module 56 calculates a first end point 5 on the side of the welding groove on the D-side approximated line 120 based on the D-side line equation (Step S82).

Further, the calculating module 56 calculates a second end point 4' on the side of the welding groove on the R-side approximated line 118 based on the R-side line equation (Step S83).

Furthermore, the calculating module 56 calculates an equation for a groove-face line 122 approximating the groove-face image 119 that is between the first end point 5 and the second end point 4' (Step S84).

Finally, the calculating module 56 calculates an intersecting point 4 of the D-side approximated line 120 or an extended line thereof and the groove-face line 122 as a welding-groove position based on the line equations (Step S85).

Those skilled in the an will appreciate that, although the teachings of the invention have been illustrated in connection with certain exemplary embodiments, there is no intent to limit the invention to the disclosed example. Instead, the intention of this application is to cover all modifications and embodiments fairly falling within the scope of the appended claims either literally or under the doctrine of equivalents.

What is claimed is:

1. A method of measuring a welding-groove position for an over-lapped fillet welding of at least a first thin member and a second thin member with a measuring apparatus, comprising steps of:

projecting, with a projection module of the measuring apparatus, a slit light on both the first thin member and the second thin member crossing a welding-groove face;

capturing, with a two-dimensional image acquisition module of the measuring apparatus, a slit-light image projected on each of a first projection surface of the first thin member and a second projection surface of the second thin member as two-dimensional images;

converting, with a three-dimensional conversion module of the measuring apparatus, the two-dimensional images into three-dimensional images using a predetermined three-dimensional conversion parameter; and calculating, with a calculation module of the measuring apparatus, the welding-groove position based on three-dimensional data corresponding to the three-dimensional images, and relative positions between the three-dimensional images in the three-dimensional data defined by shapes and arrangement of both the first thin member and the second thin member;

wherein when the welding-groove face is substantially perpendicular to the first projection surface and the second projection surface, projecting the slit light includes projecting the slit light substantially in parallel with the welding-groove face, capturing the slit-light image includes capturing a first slit-light image and a second slit-light image as the two-dimensional images so that the first slit-light image projected on the first projection surface of the first thin member, and the second slit-light image projected on the second projection surface of the second thin member are arranged spaced apart and substantially in parallel with each other in a captured image, and calculating the welding-groove position includes:

calculating an equation for a first approximated straight line of the first slit-light image based on three-dimensional data corresponding to the first slit-light image;

calculating an equation for a second approximated straight line of the second slit-light image based on three-dimensional data corresponding to the second slit-light image;

calculating a position of an end point of the second approximated straight line on a side of a welding groove based on the equation for the second approximated straight line;

calculating an equation for a third straight line that passes through the end point, and is substantially perpendicular to the second approximated straight line, and is intersectable with the first approximated straight line; and calculating an intersecting point of the first approximated straight line and the third straight line as the welding-groove position based on the equation for the first approximated straight line and the equation for the third straight line.

2. A method of measuring a welding-groove position for an over-lapped fillet welding of at least a first thin member and a second thin member with a measuring apparatus, comprising steps of:

projecting, with a projection module of the measuring apparatus, a slit light on both the first thin member and the second thin member crossing a welding-groove face;

capturing, with a two-dimensional image acquisition module of the measuring apparatus, a slit-light image projected on each of a first projection surface of the first thin member and a second projection surface of the second thin member as two-dimensional images;

converting, with a three-dimensional conversion module of the measuring apparatus, the two-dimensional images into three-dimensional images using a predetermined three-dimensional conversion parameter; and calculating, with a calculation module of the measuring apparatus, the welding-groove position based on three-dimensional data corresponding to the three-dimensional images, and relative positions between the three-dimensional images in the three-dimensional data defined by shapes and arrangement of both the first thin member and the second thin member;

wherein when the welding-groove face is substantially perpendicular to the first projection surface and the second projection surface, projecting the slit light includes projecting the slit light inclined to the welding-groove face, capturing the slit-light image includes capturing a first slit-light image, a second slit-light image, and a third slit-light image as the two-dimensional images, so that the first slit-light image projected on the first projection surface of the first thin member and the second slit-light image projected on the second projection surface of the second thin member are arranged spaced apart and substantially in parallel with each other in a captured image, and the third slit-light image projected on the welding-groove face is arranged between the first slit-light image and the second slit-light image in the captured image, and calculating the welding-groove position includes:

calculating an equation for a first approximated straight line of the first slit-light image based on three-dimensional data corresponding to the first slit-light image;

calculating an equation for a second approximated straight line of the second slit-light image based on three-dimensional data corresponding to the second slit-light image;

calculating a position of a predetermined point on the third slit-light image based on three-dimensional data corresponding to the third slit-light image;

calculating an equation for a fourth straight line that is substantially perpendicular to the second approximated straight line, and passes through the predetermined point; and calculating an intersecting point of the first approximated straight line and the fourth straight line as the welding-groove position based on the equation for the first approximated straight line and the equation for the fourth straight line.

3. A method of measuring a welding-groove position for an over-lapped fillet welding of at least a first thin member and a second thin member with a measuring apparatus, comprising steps of:

projecting, with a projection module of the measuring apparatus, a slit light on both the first thin member and the second thin member crossing a welding-groove face;

capturing, with a two-dimensional image acquisition module of the measuring apparatus, a slit-light image projected on each of a first projection surface of the first thin member and a second projection surface of the second thin member as two-dimensional images;

converting, with a three-dimensional conversion module of the measuring apparatus, the two-dimensional images into three-dimensional images using a predetermined three-dimensional conversion parameter; and calculating, with a calculation module of the measuring apparatus, the welding-groove position based on three-dimensional data corresponding to the three-dimensional images, and relative positions between the three-dimensional images in the three-dimensional data defined by shapes and arrangement of both the first thin member and the second thin member;

wherein when the welding-groove face is inclined to the first projection surface and the second projection surface, capturing the slit-light image includes capturing a first slit-light image, a second slit-light image, and a third slit-light image as the two-dimensional images, so that the first slit-light image projected on the first projection surface of the first thin member and the second slit-light image projected on the second projection surface of the second thin member are arranged spaced apart and substantially in parallel with each other in a captured image, and the third slit-light image projected on the welding-groove face is arranged between the first slit-light image and the second slit-light image in the captured image, and calculating the welding-groove position includes:

calculating an equation for a first approximated straight line of the first slit-light image based on three-dimensional data corresponding to the first slit-light image;

calculating an equation for a second approximated straight line of the second slit-light image based on three-dimensional data corresponding to the second slit-light image;

calculating a position of a first end point of the first approximated straight line on a first side of a welding groove based on the equation for the first approximated straight line;

calculating a position of a second end point of the second approximated straight line on a second side of the welding groove based on the equation for the second approximated straight line;

calculating an equation for a fifth straight line of the third slit-light image between the position of the first end point and the position of the second end point based on three-dimensional data corresponding to the third slit-light image; and calculating an intersecting point of the first approximated straight line and the fifth straight line as the welding-groove position based on the equation for the first approximated straight line and the equation for the fifth straight line.

4. One or more storage devices holding instructions executable by a computing device to measure a welding-groove position for an over-lapped fillet welding of at least a first thin member and a second thin member, the one or more storage devices comprising:

a projection module for projecting a slit light on both the first thin member and the second thin member crossing a welding-groove face;

a two-dimensional image acquisition module for capturing a slit-light image projected on each of a first projection surface of the first thin member and a second projection surface of the second thin member as two-dimensional images;

a three-dimensional conversion module for converting the two-dimensional images into three-dimensional images using a predetermined three-dimensional conversion parameter; and a calculation module for calculating the welding-groove position based on three-dimensional data corresponding to the three-dimensional images, and relative positions between the three-dimensional images in the three-dimensional data defined by shapes and arrangement of both the first thin member and the second thin member;

wherein when the welding-groove face is substantially perpendicular to the first projection surface and the second projection surface, the projection module is configured to project the slit light substantially in parallel with the welding-groove face, the two-dimensional image acquisition module is configured to capture a first slit-light image and a second slit-light image as the two-dimensional images, so that the first slit-light image projected on the first projection surface of the first thin member, and the second slit-light image projected on the second projection surface of the second thin member are spaced apart and substantially in parallel with each other in a captured image, the calculation module includes:

a module for calculating an equation for a first approximated straight line of the first slit-light image based on three-dimensional data corresponding to the first slit-light image;

a module for calculating an equation for a second approximated straight line of the second slit-light image based on three-dimensional data corresponding to the second slit-light image;

a module for calculating a position of an end point of the second approximated straight line on a side of a welding groove based on the equation for the second approximated straight line;

a module for calculating an equation for a third straight line that passes through the end point, and is substantially perpendicular to the second approximated straight line, and is intersectable with the first approximated straight line; and a module for calculating an intersecting point of the first approximated straight line and the third straight line as the welding-groove position based on the equation for the first approximated straight line and the equation for the third straight line.

5. The one or more storage devices of claim 4, further comprising a line-of-sight toggle module for changing a line-of-sight of one or more of the projection module and the two-dimensional image acquisition module with respect to the welding-groove face, based on the relative positions.

6. The one or more storage devices of claim 4, wherein the projection module and the two-dimensional image acquisition module are integrated as a laser sensor.

7. One or more storage devices holding instructions executable by a computing device to measure a welding-groove position for an over-lapped fillet welding of at least a first thin member and a second thin member, the one or more storage devices comprising:

a projection module for projecting a slit light on both the first thin member and the second thin member crossing a welding-groove face;

a two-dimensional image acquisition module for capturing a slit-light image projected on each of a first projection surface of the first thin member and a second projection surface of the second thin member as two-dimensional images;

a three-dimensional conversion module for converting the two-dimensional images into three-dimensional images using a predetermined three-dimensional conversion parameter; and a calculation module for calculating the welding-groove position based on three-dimensional data corresponding to the three-dimensional images, and relative positions between the three-dimensional images in the three-dimensional data defined by shapes and arrangement of both the first thin member and the second thin member;

wherein when the welding-groove face is substantially perpendicular to the first projection surface and the second projection surface, the projection module is configured to project the slit light inclined to the welding-groove face, the two-dimensional image acquisition module is configured to capture a first slit-light image, a second slit-light image, and a third slit-light image as the two-dimensional images, so that the first slit-light image projected on the first projection surface of the first thin member and the second slit-light image projected on the second projection surface of the second thin member are spaced apart and substantially in parallel with each other in a captured image, and the third slit-light image projected on the welding-groove face is arranged between the first slit-light image and the second slit-light image in the captured image, the calculation module includes:

a module for calculating an equation for a first approximated straight line of the first slit-light image based on three-dimensional data corresponding to the first slit-light image;

a module for calculating an equation for a second approximated straight line of the second slit-light image based on three-dimensional data corresponding to the second slit-light image;

a module for calculating a position of a predetermined point on the third slit-light image based on three-dimensional data corresponding to the third slit-light image;

a module for calculating an equation for a fourth straight line that is substantially perpendicular to the second approximated straight line, and passes through the predetermined point; and a module for calculating an intersecting point of the first approximated straight line and the fourth straight line as the welding-groove position based on the equation for the first approximated straight line and the equation for the fourth straight line.

8. The one or more storage devices of claim 7, further comprising a line-of-sight toggle module for changing a line-of-sight of the projection module and/or the two-dimensional image acquisition module with respect to the welding-groove face, based on the relative positions.

9. The one or more storage devices of claim 7, wherein the projection module and the two-dimensional image acquisition module are integrated as a laser sensor.

10. One or more storage devices holding instructions executable by a computing device to measure a welding-groove position for an over-lapped fillet welding of at least a first thin member and a second thin member, the one or more storage devices comprising:
- a projection module for projecting a slit light on both the first thin member and the second thin member crossing a welding-groove face;
- a two-dimensional image acquisition module for capturing a slit-light image projected on each of a first projection surface of the first thin member and a second projection surface of the second thin member as two-dimensional images;
- a three-dimensional conversion module for converting the two-dimensional images into three-dimensional images using a predetermined three-dimensional conversion parameter; and
- a calculation module for calculating the welding-groove position based on three-dimensional data corresponding to the three dimensional images, and relative positions between the three-dimensional images in the three-dimensional data defined by shapes and arrangement of both the first thin member and the second thin member;
- wherein when the welding-groove face is inclined to the first projection surface and the second projection surface,
- the two-dimensional image acquisition module is configured to capture a first slit-light image, a second slit-light image, and a third slit-light image as the two-dimensional images, so that the first slit-light image projected on the first projection surface of the first thin member and the second slit-light image projected on the second projection surface of the second thin member are arranged spaced apart and substantially in parallel with each other in a captured image, and the third slit-light image projected on the welding-groove face is arranged between the first slit-light image and the second slit-light image in the captured image,
- the calculation module includes:
- a module for calculating an equation for a first approximated straight line of the first slit-light image based on three-dimensional data corresponding to the first slit-light image;
- a module for calculating an equation for a second approximated straight line of the second slit-light image based on three-dimensional data corresponding to the second slit-light image;
- a module for calculating a position of a first end point of the first approximated straight line on a first side of a welding groove based on the equation for the first approximated straight line;
- a module for calculating a position of a second end point of the second approximated straight line on a second side of the welding groove based on the equation for the second approximated straight line;
- a module for calculating an equation for a fifth straight line of the third slit-light image between the position of the first end point and the position of the second end point based on three-dimensional data corresponding to the third slit-light image; and
- a module for calculating an intersecting point of the first approximated straight line and the fifth straight line as the welding-groove position based on the equation for the first approximated straight line and the equation for the fifth straight line.

11. The one or more storage devices of claim 10, further comprising a line-of-sight toggle module for changing a line-of-sight of one or more of the projection module and the two-dimensional image acquisition module with respect to the welding-groove face, based on the relative positions.

12. The one or more storage devices of claim 10, wherein the projection module and the two-dimensional image acquisition module are integrated as a laser sensor.

13. An apparatus, comprising:
- a plurality of welding-groove position measuring apparatuses including one or more storage devices holding instructions executable by a computing device to measure a welding-groove position for an over-lapped fillet welding of at least a first thin member and a second thin member, each of the welding-groove position measuring apparatuses including:
  - a projection module for projecting a slit light on both the first thin member and the second thin member crossing a welding-groove face;
  - a two-dimensional image acquisition module for capturing a slit-light image projected on each of a first projection surface of the first thin member and a second projection surface of the second thin member as two-dimensional images;
  - a three-dimensional conversion module for converting the two-dimensional images into three-dimensional images using a predetermined three-dimensional conversion parameter; and
  - a calculation module for calculating the welding-groove position based on three-dimensional data corresponding to the three-dimensional images, and relative positions between three-dimensional images in the three-dimensional data defined by shapes and arrangement of both the first thin member and the second thin member;
- wherein, in a first welding-groove position measuring apparatus of the welding-groove position measuring apparatuses, when the welding-groove face is substantially perpendicular to the first projection surface and the second projection surface, the projection module is configured to project the slit light substantially in parallel with the welding-groove face, the two-dimensional image acquisition module is configured to capture a first slit-light image and a second slit-light image as the two-dimensional images so that the first slit-light image projected on the first projection surface of the first thin member, and the second slit-light image projected on the second projection surface of the second thin member are spaced apart and substantially in parallel with each other in a captured image, and the calculation module is configured to execute a module for calculating an equation for a first approximated straight line of the first slit-light image based on three-dimensional data corresponding to the first slit-light image, a module for calculating an equation for a second approximated straight line of the second slit-light image based on three-dimensional data corresponding to the second slit-light image, a module for calculating a position of a second end point of the second approximated straight line on a second side of a welding groove based on the equation for the second approximated straight line, a module for calculating an equation for a third straight line that passes through the second end point, and is substantially perpendicular to the second approximated straight line, and is intersectable with the first approximated straight line, and a module for calculating an intersecting point of the first approximated straight line and the third straight line as the welding-groove position based on the equation for the first approximated straight line and the equation for the third straight line;

wherein, in a second welding-groove position measuring apparatus of the welding-groove position measuring apparatuses, when the welding-groove face is substantially perpendicular to the first projection surface and the second projection surface, the projection module is configured to project the slit light inclined to the welding-groove face, the two-dimensional image acquisition module is configured to capture said first slit-light image, said second slit-light image, and a third slit-light image as the two-dimensional images, so that the third slit-light image projected on the welding-groove face is arranged between the first slit-light image and the second slit-light image in the captured image, and the calculation module is configured to execute a module for calculating the equation for the first approximated straight line of the first slit-light image based on three-dimensional data corresponding to the first slit-light image, a module for calculating the equation for the second approximated straight line of the second slit-light image based on three-dimensional data corresponding to the second slit-light image, a module for calculating a position of a predetermined point on the third slit-light image based on three-dimensional data corresponding to the third slit-light image, a module for calculating an equation for a fourth straight line that is substantially perpendicular to the second approximated straight line, and passes through the predetermined point, and a module for calculating an intersecting point of the first approximated straight line and the fourth straight line as the welding-groove position based on the equation for the first approximated straight line and the equation for the fourth straight line;

wherein, in a third welding-groove position measuring apparatus of the welding-groove position measuring apparatuses, when the welding-groove face is inclined to the first projection surface and the second projection surface, the two-dimensional image acquisition module is configured to capture said first slit-light image, said second slit-light image, and said third slit-light image as the two-dimensional images, and the calculation module is configured to execute a module for calculating the equation for the first approximated straight line of the first slit-light image based on three-dimensional data corresponding to the first slit-light image, a module for calculating the equation for the second approximated straight line of the second slit-light image based on three-dimensional data corresponding to the second slit-light image, a module for calculating a position of a first end point of the first approximated straight line on a first side of the welding groove based on the equation for the first approximated straight line; a module for calculating the position of the second end point of the second approximated straight line on the second side of the welding groove based on the equation for the second approximated straight line, a module for calculating an equation for a fifth straight line of the third slit-light image between the position of the first end point and the position of the second end point based on three-dimensional data corresponding to the third slit-light image, and a module for calculating an intersecting point of the first approximated straight line and the fifth straight line as the welding-groove position based on the equation for the first approximated straight line and the equation for the fifth straight line; and wherein the apparatus further comprises:
 a reception module for receiving a user input relating to a selection of one of the welding-groove position measuring apparatuses corresponding to the first thin member and the second thin member to be measured; and
 a toggle module for switching to the one of the welding-groove position measuring apparatuses based on the user input.

* * * * *

UNITED STATES PATENT AND TRADEMARK OFFICE
CERTIFICATE OF CORRECTION

PATENT NO. : 7,657,082 B2
APPLICATION NO. : 11/335173
DATED : February 2, 2010
INVENTOR(S) : Kubo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1052 days.

Signed and Sealed this

Thirtieth Day of November, 2010

David J. Kappos
*Director of the United States Patent and Trademark Office*